US009756677B2

(12) United States Patent
Backholm et al.

(10) Patent No.: US 9,756,677 B2
(45) Date of Patent: Sep. 5, 2017

(54) DETECTION AND REPORTING OF KEEPALIVE MESSAGES FOR OPTIMIZATION OF KEEPALIVE TRAFFIC IN A MOBILE NETWORK

(71) Applicant: Seven Networks, LLC, Marshall, TX (US)

(72) Inventors: Ari Backholm, Los Altos, CA (US); Michael Fleming, Redwood City, CA (US); Andrii Kokhanovskyi, Kiev (UA); Sungwook Yoon, Palo Alto, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 15/443,424

(22) Filed: Feb. 27, 2017

(65) Prior Publication Data

US 2017/0171906 A1    Jun. 15, 2017

Related U.S. Application Data

(63) Continuation of application No. 15/051,609, filed on Feb. 23, 2016, now Pat. No. 9,591,688, which is a
(Continued)

(51) Int. Cl.
*H04W 76/04* (2009.01)
*H04L 12/26* (2006.01)
*H04L 29/06* (2006.01)

(52) U.S. Cl.
CPC .......... *H04W 76/045* (2013.01); *H04L 43/10* (2013.01); *H04L 69/16* (2013.01)

(58) Field of Classification Search
CPC ............ H04W 76/045; G06F 17/30011; G06F 17/3089; G06Q 10/10; G06Q 30/02
(Continued)

(56) References Cited

U.S. PATENT DOCUMENTS 6,212,175 B1    4/2001  Harsch
6,693,919 B1    2/2004  Kameyama
(Continued)

FOREIGN PATENT DOCUMENTS

KR    1020100085240 A    7/2010

OTHER PUBLICATIONS

InnovationQ-IP.com: Search results of "Monitoring kee-alive message", Aug. 31, 2016, https://iq.ip.com/discover.
(Continued)

*Primary Examiner* — Jamal Javaid
(74) *Attorney, Agent, or Firm* — NK Patent Law, PLLC

(57) ABSTRACT

Detection of network transactions or keepalives for maintaining long lived connections are disclosed. A keepalive detector can detect keepalive traffic based on keepalive parameters determined from an analysis of socket level network communication log data that record data transfer events including data sent from mobile applications or clients on a mobile device and data received by the mobile applications or clients on the mobile device, timing characteristics, protocol types, etc. Various statistical analyses can be performed on the network communication data to detect keepalives, taking into account variability in intervals of the data transfer events and sizes of data sent and received on each event. The keepalive detector can also detect keepalives from stream data on a mobile device by analyzing socket level communication messages including timing characteristics and amount of data transferred to detect keepalives and report keepalives using a data structure.

18 Claims, 19 Drawing Sheets

Related U.S. Application Data continuation of application No. 14/266,759, filed on Apr. 30, 2014, now Pat. No. 9,271,325.

(60) Provisional application No. 61/836,039, filed on Jun. 17, 2013, provisional application No. 61/823,340, filed on May 14, 2013, provisional application No. 61/817,718, filed on Apr. 30, 2013.

(58) Field of Classification Search
USPC .......................... 370/338, 229, 230, 252, 401
See application file for complete search history.

(56) References Cited

U.S. PATENT DOCUMENTS

| | | |
|---|---|---|
| 6,715,082 B1 | 3/2004 | Chang et al. |
| 7,406,087 B1 | 7/2008 | Quach et al. |
| 7,768,939 B1 * | 8/2010 | Trivedi .................. H04L 43/10 370/252 |
| 8,799,410 B2 | 8/2014 | Fiatal |
| 8,838,744 B2 | 9/2014 | Fiatal |
| 2003/0157947 A1 | 8/2003 | Fiatal et al. |
| 2005/0071674 A1 | 3/2005 | Chou et al. |
| 2005/0188098 A1 | 8/2005 | Dunk |
| 2006/0190569 A1 | 8/2006 | Neil et al. |
| 2007/0019610 A1 | 1/2007 | Backholm et al. |
| 2007/0140193 A1 | 6/2007 | Dosa et al. |
| 2008/0022336 A1 | 1/2008 | Howcroft |
| 2008/0039032 A1 | 2/2008 | Haumont |
| 2010/0124211 A1 | 5/2010 | Payyappilly et al. |
| 2011/0280134 A1 | 11/2011 | Zheng |
| 2012/0135726 A1 | 5/2012 | Luna et al. |
| 2013/0060815 A1 | 3/2013 | Saeki |
| 2014/0280892 A1 | 9/2014 | Reynolds et al. |

OTHER PUBLICATIONS

U.S. Notice of Allowance for U.S. Appl. No. 15/079,089, dated Sep. 6, 2016.
U.S. Notice of Allowance for U.S. Appl. No. 15/051,609, dated Oct. 28, 2016.
U.S. Notice of Allowance for U.S. Appl. No. 14/662,161, dated Sep. 6, 2016.
U.S. Notice of Allowance for U.S. Appl. No. 14/662,161, mailed Aug. 2, 2016.
U.S. Notice of Allowance for U.S. Appl. No. 14/500,241, mailed Sep. 26, 2016.
U.S. Notice of Allowance for U.S. Appl. No. 14/266,749, mailed Dec. 16, 2015.
U.S. Non-Final Office Action for U.S. Appl. No. 15/079,089, mailed Jul. 19, 2016.
U.S. Non-Final Office Action for U.S. Appl. No. 15/051,609, mailed Apr. 13, 2016.
U.S. Non-Final Office Action for U.S. Appl. No. 14/500,241, mailed May 25, 2016.
U.S. Non-Final Office Action for U.S. Appl. No. 14/266,759, mailed Jun. 22, 2015.
PCT, International Preliminary Report on Patentability, for PCT/US2014/036262, dated Nov. 3, 2015.
PCT, International Preliminary Report on Patentability, for PCT/US2014/036262, dated Sep. 24, 2014.
U.S. Final Office Action for U.S. Appl. No. 14/468,282, mailed Nov. 10, 2015.
U.S. Final Office Action for U.S. Appl. No. 14/266,759, mailed Oct. 8, 2015.
U.S. Corrected Notice of Allowance for U.S. Appl. No. 14/500,241, dated Nov. 4, 2016.

* cited by examiner

FIG. 1A

DETECTION AND REPORTING OF KEEPALIVE MESSAGES FOR OPTIMIZATION OF KEEPALIVE TRAFFIC IN A MOBILE NETWORK

CROSS-REFERENCE TO RELATED APPLICATIONS

The present application is a continuation of U.S. Utility patent application Ser. No. 15/051,609 titled "DETECTION AND REPORTING OF KEEPALIVE MESSAGES FOR OPTIMIZATION OF KEEPALIBE TRAFFIC IN A MOBILE NETWORK" filed on Feb. 23, 2016, and is a continuation of U.S. Utility patent application Ser. No. 14/266,759 titled "DETECTION AND REPORTING OF KEEPALIVE MESSAGES FOR OPTIMIZATION OF KEEPALIBE TRAFFIC IN A MOBILE NETWORK" filed on Apr. 30, 2014, which claims priority to and benefit from U.S. Provisional Patent Application Ser. No. 61/817,718 titled "OPTIMIZATION OF NON-USER INTERACTIVE TRAFFIC IN A MOBILE NETWORK BY KEEP ALIVE IDENTIFICATION AND DELAY TOLERANCE OF KEEP ALIVE MESSAGES AND OTHER NON-USER INTERACTIVE TRAFFIC" filed on Apr. 30, 2013; U.S. Provisional Patent Application Ser. No. 61/823,340 titled "IDENTIFICATION AND REPORTING OF KEEP-ALIVE MESSAGES AND OTHER NON-USER INTERACTIVE TRAFFIC IN A MOBILE NETWORK" filed on May 14, 2013; and U.S. Provisional Patent Application Ser. No. 61/836,039 titled "IDENTIFICATION AND REPORTING OF KEEP-ALIVE MESSAGES AND OTHER NON-USER INTERACTIVE TRAFFIC IN A MOBILE NETWORK" filed on Jun. 17, 2013. The entire content of the aforementioned applications are expressly incorporated by reference herein.

BACKGROUND

When a connection is established between a client and a server, the two entities dedicate a portion of their resources to the connection. Typically, after a data transfer session is completed, the connection between the client and the server is terminated by the client or the server by sending an IP packet (e.g., FIN packet). However, sometimes the client and the server can maintain the connection by using keepalive messages or heartbeat messages. A keepalive message can be sent an entity at one end of a connection to check the operational status of another entity at the other end of the connection. When the receiving entity receives a keepalive message from a sending entity, the receiving entity immediately replies with an acknowledgment message, thereby informing the sending entity that it is alive or operational. If, however, the sending entity does not receive an acknowledgement message for a period of time, the sending entity can terminate the connection.

The keepalive messages from these always-on applications allow the applications to receive messages with less delay. However, this improvement in latency has associated costs. These costs include consumption of a significant amount of energy in mobile devices, additional signaling in the mobile network and bandwidth consumption. For example, to be able to send keepalive messages frequently, a mobile device needs to frequently transition its radio between a high powered state and an idle state or remain in a high powered state instead of the idle state for a longer period of time, resulting in fast draining of battery. These radio transitions also cause additional signaling in the networks as radio resource control (RRC) messages need to be exchanged between the mobile device and base station to establish a radio link. Furthermore, each keepalive message can be as large as 20-60 bytes in size, and a large number of such keepalive messages from multiple application can add up to consume a substantial chunk of the network bandwidth. Thus keepalive optimization is desired. However, keepalive optimization can occur only when keepalives can be accurately detected.

BRIEF DESCRIPTION OF THE DRAWINGS

Figure 1A:
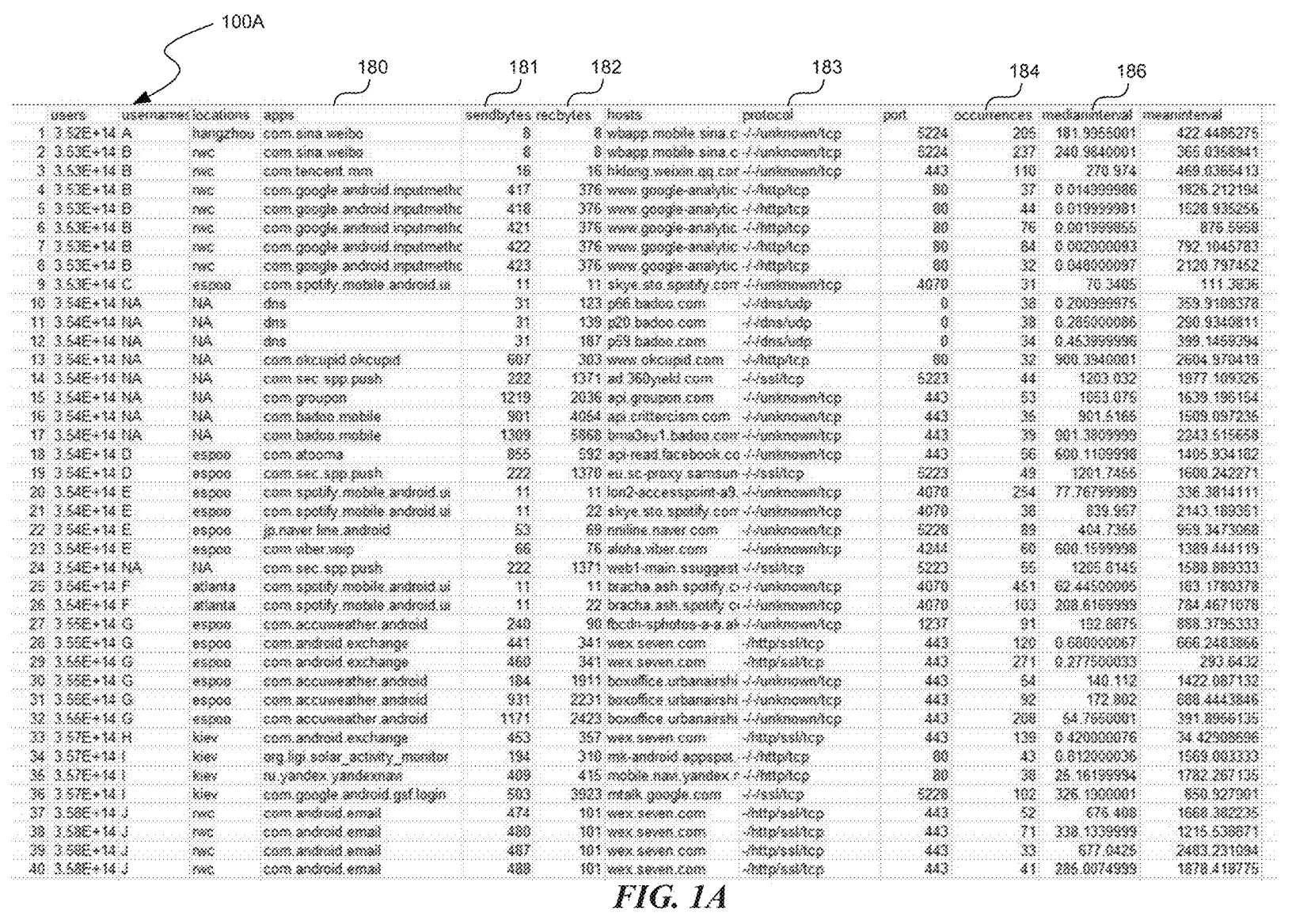

FIG. 1A depicts an example of data sent or received by mobile applications on a mobile device using utilizing various proprietary, non-proprietary and/or encrypting protocols read from a Transport Control Protocol (TCP) stream for detecting and optimizing keepalive traffic in a mobile network.

DETAILED DESCRIPTION

Figure 1B:
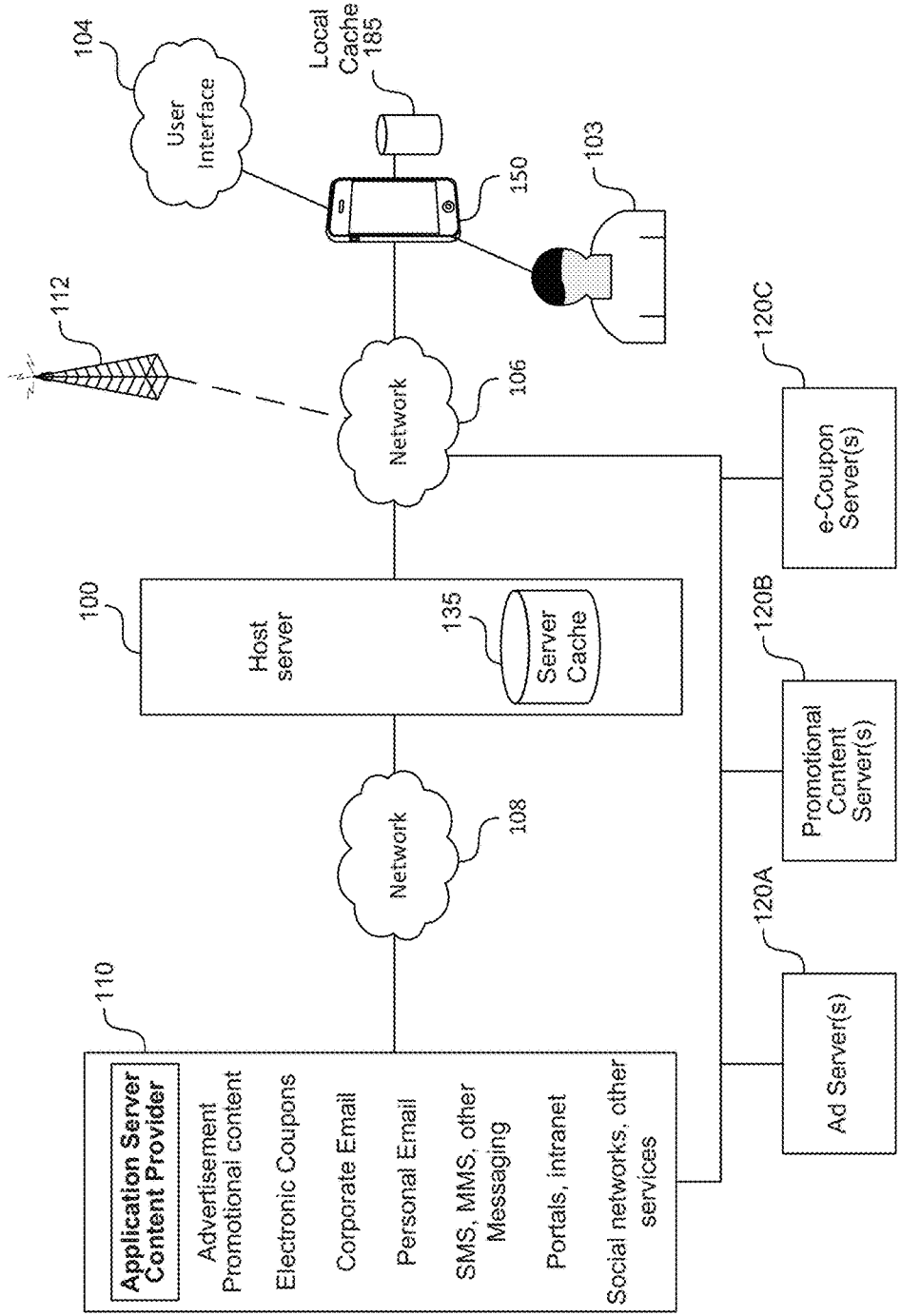
FIG. 1B depicts an example diagram of a system where a host server facilitates management of traffic, content caching, and/or resource conservation between mobile devices (e.g., wireless devices), an application server or content provider, or other servers such as an ad server, promotional content server, or an e-coupon server in a wireless network (or broadband network) for resource conservation. The host server can further determine parameters that can be used in identifying keepalives from a TCP stream for optimizing keepalive traffic in a mobile network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include technology for detecting or identifying keepalive messages ("keepalives") from Transport Control Protocol (TCP) streams in a mobile network (hereinafter "keepalive detection technology").

Existing systems and methods can optimize mobile traffic over standard and non-proprietary application level protocols including, but not limited to: Hypertext Transfer Protocol (HTTP), Hypertext Transfer Protocol Secure (HTTPS), File Transfer Protocol (FTP), Simple Mail Transfer Protocol (SMTP), Internet Message Access Protocol (IMAP), Post Office Protocol (POP), and the like. However, many mobile applications are moving away from the standard protocols towards vendor specific proprietary protocols. For example, Google utilizes a non-standard Transmission Control Protocol (TCP) port 5228. By way of another example, the "WhatsApp" mobile application uses a customized version of the Extensible Messaging and Presence Protocol (XMPP). Similarly, some applications such as Skype and Yahoo mail use their own proprietary protocols, while others such as Urban Airship's push notifications protocol is used by various vendors.

Typically, to perform any detection and optimization of traffic such as keepalive traffic, non-interactive traffic or other user interactive traffic, the protocols must be well understood. For example, the header and other protocol specific data must be known before any optimization can be performed. As proprietary protocols are not standardized and not well understood, mobile traffic over such proprietary protocols cannot be optimized by existing optimization systems and methods. The disclosed technology can identify keepalives from the TCP streams regardless of the application level protocols used by the applications from where the keepalives originate and enable optimization of the keepalives. Thus, the disclosed keepalive detection technology provides a protocol agnostic technology for identifying keepalives for optimization. Optimization of the keepalives in a wireless or mobile network conserves the resources on mobile devices and/or the server by reducing signaling, number of unnecessary radio transitions (powering up or powering down) and battery drain. In some embodiments, the keepalive detection technology can identify traffic that includes keepalive and excludes payload traffic or other higher safety scenarios to engage in keepalive optimization.

In some embodiments, the keepalive detection technology can be used to categorize mobile transactions as transactions associated with (a) keepalives; (b) other non-interactive traffic; and (c) interactive traffic to facilitate management and conservation of traffic in mobile networks.

In some embodiments, the keepalive detection technology utilizes Transport Control Protocol (TCP) streaming optimization along with a local proxy and/or a proxy server of a distributed proxy system to identify transactions within a TCP stream. The keepalive detection technology includes categorization of those transactions to (a) keepalives; (b) other non-interactive traffic; and (c) interactive traffic.

In some embodiments, the keepalive detection technology can identify network transactions (e.g., keepalives) based on a combination of parameters, such as but not limited to: periodicity or intervals, size thresholds, similar/repeating content, content following a certain pattern (e.g., content having an incrementing or decrementing portion or counter) and/or based on knowledge of the actual application level protocol. In some embodiments, non-interactive traffic and interactive traffic can be distinguished from each other by proxies of user activity, a status of the application performing the data transfer (e.g., foreground, background, active, non-active), status of output mechanisms, such as screen, audio, notification LED, Bluetooth, NFC, RFID, touch sensor, any other types of sensors, camera, etc., readings from the any other sensors or detectors of the device, such as microphone, accelerometer, biosensors, location sensors, motion sensors, etc., or a combination thereof.

In some embodiments, some applications and servers send small sized information back and forth in regular interval to keep their TCP connection alive. These information can recorded in a log. The keepalive detection technology can detect or identify keepalives based on an analysis of socket level network communication log data ("netlog"). FIG. 1A depicts an example table 100A of data sent or received by mobile applications on a mobile device using utilizing various proprietary, non-proprietary and/or encrypting protocols read from a Transport Control Protocol (TCP) stream and recorded in a netlog for detecting and optimizing keepalive traffic in a mobile network. The table 100A can include various fields of information such as application names 180, the data sent from the application to the network (e.g., sendbytes or fromapp bytes 181), the data received by the application from the network (e.g., recbytes or fromnet bytes 182), the host names of the application servers associated with the applications, the application-level protocol 183, port numbers, number of occurrences 184 (e.g., the number of times that the same or similar sized bytes of data from sent and received), the median interval 186 (e.g., median of the intervals between each of the occurrences 184) and the mean interval.

In many instances, there can be ambiguities in the recorded netlog data that can prevent accurate detection of keepalives. One example ambiguity is the keepalive interval (i.e., the time period between two keepalives). The interval at which the information is sent back and forth may not be regular all the time. This may be due to the soft timer issue, usage of a mobile device by a user, network delay, or the like. Particularly a user's use of the application can greatly alter the keepalive activity, resulting in highly variable keepalive intervals. Similarly, another ambiguity in detecting keepalives can be the information size (byte size). The information size can be irregular due to the design of the application or the server or other reasons. For example, an application may send different sized information but within some bound, e.g., 40~50 bytes for every keepalive spot. The keepalive detection technology can detect and resolve any ambiguities in the recorded netlog data in the process of detecting keepalives. The keepalive detection technology can do so by detecting a regular interval and regular byte sizes of data sent back and forth between the mobile device and the associated server. In the table 100A, the sendbytes 181 and the recbytes 182 fields can be the regular byte sizes for keepalives from applications. The table 100A can also include a field for the regular interval and/or results from any other intermediate calculations (e.g., standard deviation, quartiles, variance, etc.) performed in the process of determining the regular interval and/or regular byte sizes.

In some embodiments, the keepalive detection technology can detect a pattern of data sent (i.e., data sent from an application to a server or fromapp bytes or sendbytes) and data received (i.e., data received by the application from the server or fromnet bytes or recbytes) as a regular pattern if, for example, one or more of the following conditions are true.

1. The pattern occurs more than $X times per $D duration. The $ sign is used herein to indicate that the frequency parameter "X" and the duration parameter "D" are tunable. In one example implementation, a pattern of fromapp bytes and fromnet bytes occurring 10-15 times per day can be considered a regular pattern.

2. The interval time is uniform. The interval is uniform if $1^{st}$ quartile and $3^{rd}$ quartile's difference is smaller than $Y % of median interval. In one embodiment, 10-15% can be used for $Y %. Alternatively, in some implementations, without looking at $1^{st}$ or $3^{rd}$ quartiles, a pattern can be declared as uniform if it contains a sequence of $K keepalives (e.g., fromapp and fromnet bytes, fromapp bytes or fromnet bytes) whose intervals' variance is smaller than $V. In one example implementation, $K=3 and $V=0.1 can be used. The $ sign is used herein to indicate that the frequency parameter "Y," "K" and "V" are tunable.

3. The median interval time is bigger than $Z seconds. In one example implementation, 60 seconds can be used for $Z. The $ sign is used herein to indicate that the median interval time "Z" is tunable.

The parameters described above can generally be made tighter or looser (i.e., higher or lower) to adjust the aggressiveness in which the pattern is to be identified as a pattern having a regular interval. In some embodiments, all three of the conditions described above may need to be satisfied in order to determine whether a pattern has a regular interval or an irregular interval.

In some embodiments, the keepalive detection technology can detect regular byte size pattern of an application, by using the following methodology.

1. Check fromapp/fromnet bytes. If same fromapp/fromnet bytes occur in regular interval (e.g., as defined above), then the keepalive detection technology detects a keepalive.

2. If 1 fails, the keepalive detection technology can find the pattern from the same fromapp bytes. If the pattern occurs in a regular interval, then the keepalive detection technology detects a keepalive.

3. If 2 fails, the keepalive detection technology can find the pattern just from the same fromnet bytes. If the patterns occurs in a regular interval, then the keepalive detection technology detects a keepalive.

4. If 3 fails, the keepalive detection technology can approximately cluster fromapp/fromnet bytes. With a clustering algorithm (e.g., K-means), the keepalive detection technology can identify similar sized fromapp/fromnet bytes patterns. If the sizes in the cluster are similar (e.g., small variance $V2, another tunable parameter), and if they occur in a regular interval then the keepalive detection technology detects a keepalive. In some embodiments, the clustering technique in statistical programming languages (e.g., R for Statistical Computing) can be used. Alternatively, a bucketing method can be employed to bucket the fromapp/fromnet bytes.

5. If 4 fails, keepalive detection technology can apply a clustering algorithm only to fromapp bytes. If the biggest cluster's variance is smaller than $V2 and the fromapp bytes occur in a regular interval, then the keepalive detection technology detects a keepalive.

6. If 5 fails, the keepalive detection technology can apply a clustering algorithm only to fromnet bytes. If the biggest cluster's variance is smaller than $V2 and they occur in a regular interval, then the keepalive detection technology detects a keepalive.

The keepalive detection technology can then confirm successful detection of a keepalive if (1) some of the keepalive entries share the same TCP session or connection (e.g., based on the TCP session identifier) and if (2) the keepalives are proxy streamed. The determination of regular interval and regular byte sizes of keepalives for detecting the keepalives are described in detail with respect to the network log data analyzer component of a keepalive detector in FIGS. 3 and 4B and logic flow diagrams of FIGS. 5-8.

In some embodiments, the keepalive detection technology can analyze information in a traffic data report (TDR) in detecting keepalives. A TDR or TDR message can be used to report traffic data immediately after their completion (e.g., handshakes). The detection of a keepalive can include examining a TDR message including stream data (or data from a TCP stream) for socket time created and an amount of data transferred. For example, based on the socket time created, the keepalive detection technology can determine if the time of creation of the socket was much before the current time (i.e., $T_{create} \ll T_{now}$). Similarly, based on the amount of data transferred, the keepalive detection technology can determine if some stream data transferred is less than a threshold (e.g., MAX_KEEP_ALIVE_PACKET). Based on these determinations, the keepalive detection technology can detect whether the TDR message including the stream data includes a keepalive. Once a stream has been identified to contain keepalives, any traffic on that stream can be categorized as keepalives in some embodiments.

In some embodiments, the accuracy in detecting keepalives by analyzing TDR messages can be improved based on an analysis of frequency of data transferred. The frequency of data transferred can be determined based on event history from the TDR messages by, for example, analyzing interval for keepalives.

The keepalive detection technology includes a data structure for storing information about a connection object that is possibly a keepalive and any other data needed from the TDR messages. The data structure can also comprise a container (e.g., a class or data structure) for storing the connection object. The container can be based on recurring requests (RR) (i.e., based on identifying similar requests from an application for polling, caching, etc.) and can be mapped to a connection ID. The keepalive detection technology can, in some embodiments, report keepalive via an analysis field.

In some embodiments, the keepalive detection technology can implement keepalive detection by creating a connections container. On TDR execution (for keepalives, handling TDR_TYPE_STREAM_DATA), the keepalive detection technology determines a connection ID which is a unique value associated with the TDR message including stream data. The keepalive detection technology then searches for an appropriate connection in a connections map using the connection ID. In the event that a connection object with a matching connection ID is found, the keepalive detection technology updates the connection object and analytics (e.g., timing calculations, amount of small data transfers). In some embodiments, when a connection object with a matching connection ID cannot be found, the keepalive detection technology creates a connection object with information from the TDR message and inserts the connection object into the connections map with the connection ID. Any changes associated with the connection object is then reported in the analysis field of a log (e.g., a client reporting and capture service or CRCS log). On execution of a connection tear down (CTD) event or connection termination event (i.e., an event when a TCP connection is terminated by the application or the server), the keepalive detection technology searches for an appropriate connection in the connections map using the connection ID. In case a connection object with a matching connection ID is found, the connection object is removed from the connection map and deleted.

As described above, the keepalive detection technology can implement a detection logic that in response to detecting a TDR message with type TDR_TYPE_STREAM_DATA for a socket that was created more than, for example, a minimum interval ago (e.g., SC_MIN_TCPCONNECTION_CREATION_INTERVAL seconds ago, e.g., default 300 seconds), creates a connection object. This connection object is a potential keepalive connection. For such a connection object, the detection logic can create a weight variable (e.g., a "keepalive weight") which can be initialized on connection object creation with value=1. Analyzing each TDR message, the keepalive weight can be increased by 1, for example, if the amount of data transferred from a local proxy on a mobile device to a proxy server (e.g., on a host server) and from the server to the mobile device is less than, for example, SC_MAX_BYTES_AMOUNT bytes (e.g., default 100 bytes) and time since last data transfer is more than, for example, SC_MIN_IT seconds (e.g., default 300 seconds). When the keepalive weight is more than a threshold (e.g., SC_KEEPALIVE_WEIGHT, with a default value of e.g., 3), the keepalive detection technology can assume that a keepalive has been detected.

The keepalive analysis and detection, including each change in the connection object can be reported, for example, in an analysis field. An example data structure for reporting keepalives have the form of:

KA[KA1/KA2/KA3/KA4]

KA1 is a unique ID for connection or connection ID, KA2 is a connection creation time, KA3 is a flag indicating whether the connection is already detected as a keepalive and can be a Boolean value (0/1) and KA4 is the keepalive weight.

Once a TCP stream has been identified to contain keepalives, any traffic on that stream can be categorized as keepalives. This is because the KA3 flag value reflects whether the connection has been identified as containing keepalives. In some embodiments, the KA3 flag does not tell whether the reported packet in the TCP stream is believed to be a keepalive. In some embodiments, the keepalive detection technology includes an additional flag KA5 which can be used to indicate whether the packet contained in the TCP stream is a keepalive or not. Thus, in some embodiments, the data structure for reporting keepalives can be of the following example form:

KA[KA1/KA2/KA3/KA4/KA5]

KA1 is a unique ID for the connection, KA2 is the connection creation time, KA3 is an indication whether the connection is already detected as keepalive and can be a value of 0 or 1, KA4 is the keepalive weight and KA5 is an indication whether the current packet is a keepalive and can have a value of 0 or 1. An example of a portion of a netlog report including the data structure for reporting keepalives is provided below:

```
2013-04-30 12:49:58.571 netlog 10 240 92 92 240 0 0
rptuse20120814.getjar.com com.accuweather.android
background proxy_stream KA[138806279670/1367326198/0/1/0] 1 1227
2013-04-30 12:56:59.916 netlog 10 0 2 2 0 0 0 rptuse20120814.getjar.com
com.accuweather.android
background proxy_stream KA[138806279670/1367326198/0/2/1] 1 1227
2013-04-30 13:00:05.295 netlog 10 0 4 4 0 0 0 rptuse20120814.getjar.com
com.accuweather.android
background proxy_stream KA[138806279670/1367326198/1/3/1] 1 1227
2013-04-30 13:06:11.904 netlog 10 0 4 4 0 0 0 rptuse20120814.getjar.com
com.accuweather.android
background proxy_stream KA[138806279670/1367326198/1/4/1] 1 1227
2013-04-30 13:12:21.157 netlog 10 0 2 2 0 0 0 rptuse20120814.getjar.com
com.accuweather.android
background proxy_stream KA[138806279670/1367326198/1/5/1] 1 1227
2013-04-30 13:15:25.986 netlog 10 0 4 4 0 0 0 rptuse20120814.getjar.com
com.accuweather.android
background proxy_stream KA[138806279670/1367326198/1/6/1] 1 1227
2013-04-30 13:21:34.643 netlog 10 0 4 4 0 0 0 rptuse20120814.getjar.com
com.accuweather.android
background proxy_stream KA[138806279670/1367326198/1/7/1] 1 1227
```

As shown above, the first netlog record shows that KA5 flag to be 0 indicating that the proxy stream data did not carry the keepalive. Each successive netlog record shows that the KA4 is incremented by 1 and when the KA4 flag reaches an example default weight of 3, the KA3 flag is flipped from 0 to 1 indicating detection of a keepalive. The keepalive detection based on analysis of TDR messages are described in detail with respect to the connection analyzer of the keepalive detector 305 in FIG. 3 and FIG. 9.

FIG. 1B depicts an example diagram of a system where a host server facilitates management of traffic, content caching, and/or resource conservation between mobile devices (e.g., wireless devices), an application server or content provider, or other servers such as an ad server, promotional content server, an e-coupon server or a messaging server (e.g., Google Cloud Messaging (GCM) server, the Exchange ActiveSync (EAS) server) in a wireless network (or broadband network) for resource conservation. The host server can further determine parameters that can be used in identifying keepalives from a TCP stream for optimizing keepalive traffic in a mobile network.

The client devices 150 can be any system and/or device, and/or any combination of devices/systems that is able to establish a connection, including wired, wireless, cellular connections with another device, a base station/cell provider 112, a server and/or other systems such as host server 100 and/or application server/content provider 110. Client devices 150 will typically include a display and/or other output functionalities to present information and data exchanged between among the devices 150 and/or the host server 100 and/or application server/content provider 110. The application server/content provider 110 can be any server including third party servers or service/content providers further including advertisement, promotional content, publication, or electronic coupon servers or services. Similarly, separate advertisement servers 120a, promotional content servers 120b, and/or e-Coupon servers 120c as application servers or content providers are illustrated by way of example.

For example, the client/mobile devices 150 can include mobile, handheld or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a phablet (a class of smart phones with larger screen sizes between a typical smart phone and a tablet), a handheld tablet (e.g., an iPad, the Galaxy series, the Nexus, the Kindles, Kindle Fires, any Android-based tablets, Windows-based tablets, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile devices 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanisms, or others, can be used in the disclosed technology in acquiring context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/queried from the respective application/service providers 110 (by the host 100 and/or client devices 150).

The host server 100 can use, for example, contextual information obtained for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests (e.g., via user interface 104) and/or device/application maintenance tasks. The traffic can be managed such that network consumption (e.g., use of the cellular network) is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience. The host server 100 may also indirectly manage traffic via creation, selection and/or deployment of traffic blocking policy for implementation on the mobile device in some embodiments.

For example, in context of battery conservation, the device 150 can observe user activity (for example, by observing user keystrokes, backlight status, or other signals via one or more input mechanisms, etc.) and alter device 150 behaviors. The device 150 can also request the host server 100 to alter the behavior for network resource consumption based on user activity or behavior.

In one embodiment, the traffic management for resource conservation and/or keepalive optimization/algorithms for signaling optimization is performed using a distributed system between the host server 100 and client device 150. The distributed system can include proxy server and cache components on the server side 100 and on the device/client side, for example, as shown by the server cache 135 on the server 100 side and the local cache 185 on the client 150 side. In one embodiment, the traffic management for reducing signaling in the network and reducing or alleviating network congestion can be implemented on the mobile device 150 without any support from the server-side proxy or other network-side components.

Functions and techniques disclosed for context aware traffic management and keepalive algorithms for resource conservation and reducing or optimizing signaling in networks (e.g., network 106 and/or 108) and devices 150, reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Functions and techniques performed by the proxy and cache components in the client device 150 and the related components therein are described, respectively, in detail with further reference to the examples of FIG. 2A.

In one embodiment, client devices 150 communicate with the host server 100 and/or the application server 110 over network 106, which can be a cellular network and/or a broadband network. To facilitate overall traffic management between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote login, email, news, RSS, cloud-based services, instant messaging, visual voicemail, push mail, VoIP, and other services through any known or convenient protocol, such as, but not limited to the TCP/IP protocol, UDP, HTTP, DNS, FTP, UPnP, NSF, ISDN, PDH, RS-232, SDH, SONET, etc.

The networks 106 and/or 108 include any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by an open network, such as the Internet, or a private network or broadband network, such as an intranet and/or the extranet. In one embodiment, communications can be achieved by a secure communications protocol, such as secure sockets layer (SSL) or transport layer security (TLS).

In addition, communications can be achieved via one or more networks, such as, but not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS-based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
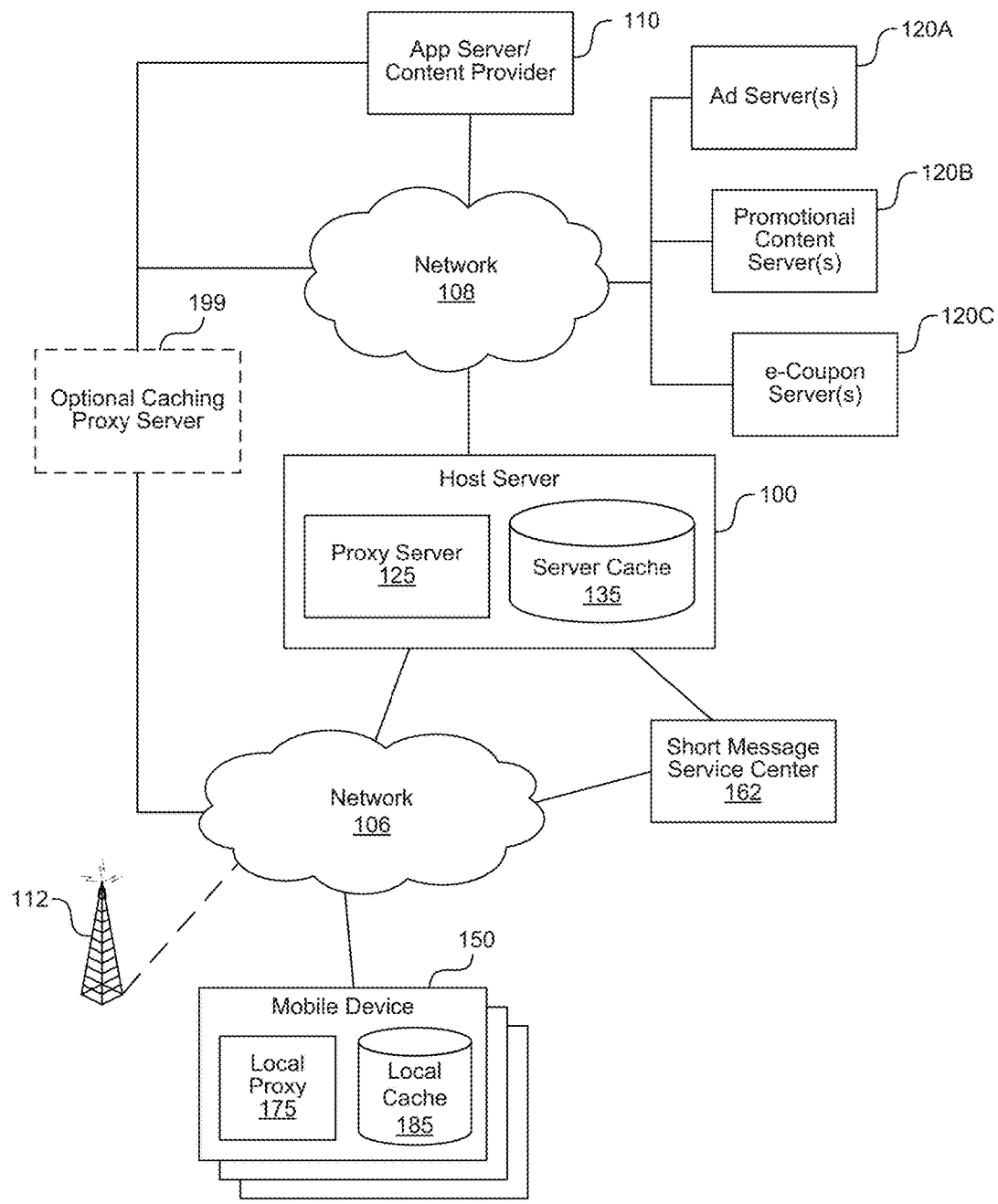
FIG. 1C depicts an example diagram of a proxy and cache system distributed between the host server and device which facilitates network traffic management between a device, an application server or content provider, or other servers such as an ad server, promotional content server, or an e-coupon server for resource conservation and content caching. The proxy system distributed among the host server and the device can further identify keepalives from a TCP stream on the mobile device for optimizing keepalive traffic in a mobile network.

FIG. 1C depicts an example diagram of a proxy and cache system distributed between the host server and device which facilitates network traffic management between a device, an application server or content provider, or other servers such as an ad server, promotional content server, an e-coupon server or a messaging server (e.g., Google Cloud Messaging (GCM) server, the Exchange ActiveSync (EAS) server) for resource conservation and content caching. The proxy system distributed among the host server and the device can further identify keepalives from a TCP stream on the mobile device for optimizing keepalive traffic in a mobile network.

The distributed proxy and cache system can include, for example, the proxy server 125 (e.g., remote proxy) and the server cache 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache 135 is external to the host server 100. In addition, each of the proxy server 125 and the server cache 135 may be partially internal to the host server 100 and partially external to the host server 100. The application server/content provider 110 can be any server including third-party servers or service/content providers further including advertisement, promotional content, publication, or electronic coupon servers or services. Similarly, separate advertisement servers 120A, promotional content servers 120B, e-Coupon servers 120C, and/or messaging servers (e.g., GCM, EAS servers) 120D as application servers or content providers are illustrated by way of example.

The distributed system can also include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider (e.g., 112), and or any combination of the above to facilitate network traffic management for network and device resource conservation. Proxy server 199 can be used, for example, for caching content to be provided to the device 150, for example, from one or more of, the application server/provider 110, host server 100, and/or a network service provider. Content caching can also be entirely or partially performed by the remote proxy 125 to satisfy application requests or other data requests at the device 150.

In context-aware traffic management and optimization for resource conservation and/or keepalive optimization in signaling optimization in a network (e.g., cellular or other wireless networks), characteristics of user activity/behavior and/or application behavior at a mobile device (e.g., any wireless device) 150 can be tracked by the local proxy 175 and communicated over the network 106 to the proxy server 125 component in the host server 100, for example, as connection metadata. The proxy server 125, which in turn is coupled to the application server/provider 110, provides content and data to satisfy requests made at the device 150. The local proxy 175 can be a protocol-agnostic component that can identify keepalives from the TCP stream, regardless of the application layer protocol.

In addition, the local proxy 175 can identify and retrieve mobile device properties, including one or more of battery level, network that the device is registered on, radio state, signal strength, cell identifier (i.e., cell ID), location area code, or whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2A.

The local cache 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices. The proxy server 125 can also receive or aggregate network communication data logs and perform statistical analyses on data sent and received to determine regular intervals and regular byte sizes for keepalives from various applications. The proxy server 125 can further push such information to multiple mobile devices to equip the mobile devices for keepalive detection and subsequent keepalive optimization.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 162, such as that provided by the network service provider, in communicating with the device 150 in achieving network traffic management. Note that SMSC 162 can also utilize any other type of alternative channel including USSD or other network control mechanisms. The host server 100 can forward content or HTTP responses to the SMSC 162 such that it is automatically forwarded to the device 150 if available and for subsequent forwarding if the device 150 is not currently available.

In general, the disclosed distributed proxy and cache system enables identification of keepalives from the TCP stream for keepalive optimization. The disclosed distributed proxy and cache system further enables optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously. Furthermore, by preventing the mobile device from constantly attempting to signal the network that is congested, and/or allowing selective (e.g., high priority) traffic towards the network, the local proxy 175 can conserve battery resources of the mobile device.

Figure 1D:
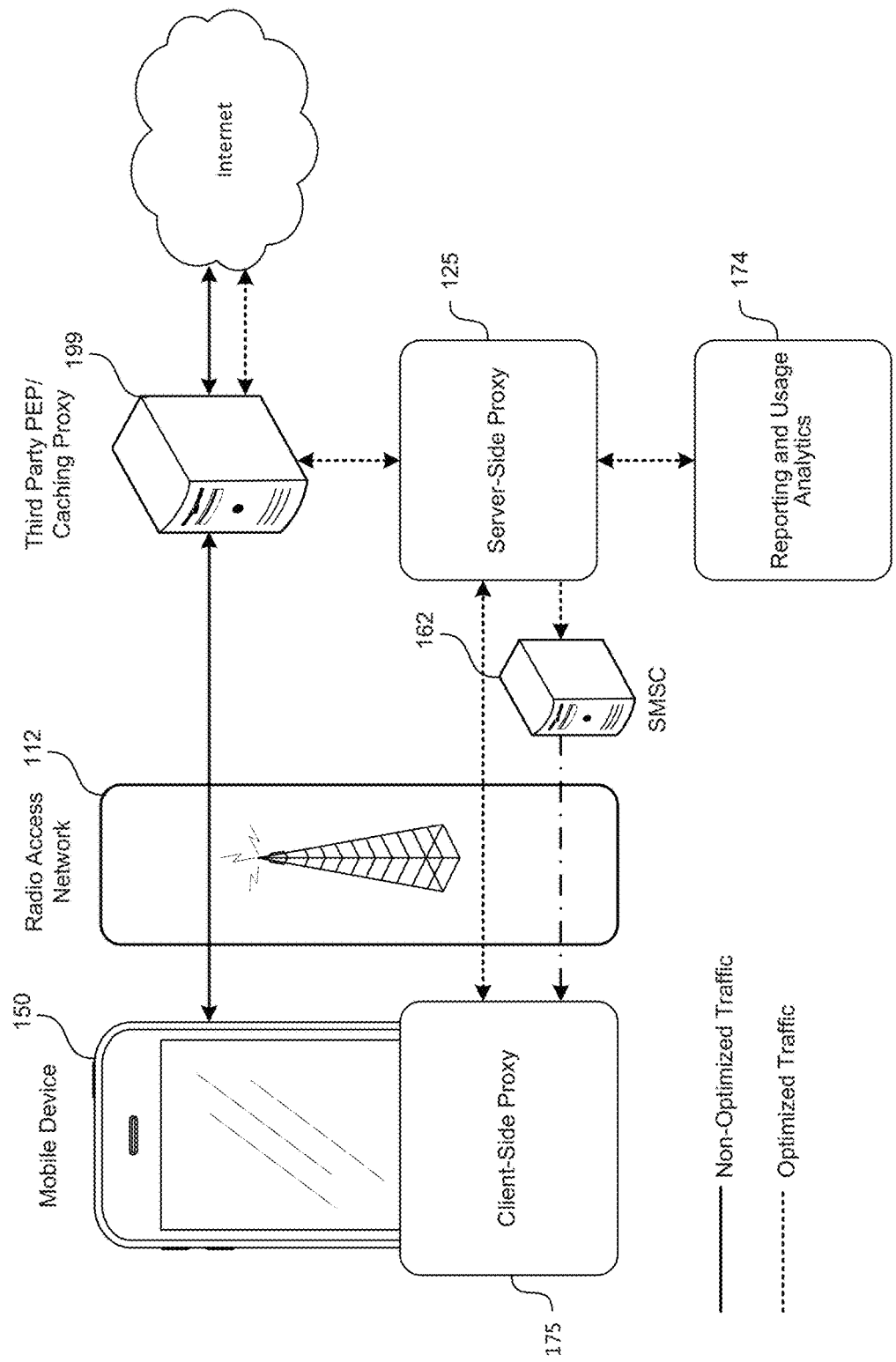
FIG. 1D depicts an example diagram of the logical architecture of a distributed proxy and cache system.

FIG. 1D illustrates an example diagram of the logical architecture of a distributed proxy and cache system. The distributed system can include, for example the following components:

Client Side Proxy 175: a component installed in a smartphone, mobile device or wireless device 150 that interfaces with device's operating system, as well as with data services and applications installed in the device. The client side proxy 175 is typically compliant with and able to operate with standard or state of the art networking protocols. Additional components and features of the client-side proxy 175 are illustrated with further references to the examples of FIG. 2A.

The server side proxy 125 can include one or more servers that can interface with third-party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third-party servers. In one embodiment, the server-side proxy 125 can utilize the store and forward functions of a short message service center (SMSC) 162 in communicating with the client-side proxy 175 on the mobile device 150 to optimize network traffic.

Log Storage and Processing Service (LSPS) 174: The log storage and processing service, server, system or component 174 can provide reporting and usage analytics services. The LSPS 174 can collect information (e.g., logs) from the client side 175 and/or the server side 125 and provide the necessary tools for producing reports and usage analytics that can be used for analyzing traffic and signaling data. The client logs (e.g., logs on the client device 150 aggregated by the local proxy 175) are stored in the device until a data channel is activated, and they are then transferred in binary format to the LSPS 174. In one embodiment, the logs are processed using log processing tools provided by the LSPS 174. The processed logs are subsequently stored in a distributed database. The logs may be used for reporting as well as for troubleshooting issues. For example, analytics from the logs can be used by the proxy system in managing, reducing or optimizing network traffic or by the network operator in monitoring their networks for possible improvements and enhancements. Note that LSPS 174 as illustrated may be a server separate from the server-side proxy 125, or it may be a component of the server-side proxy 125, residing partially or wholly therein.

In one implementation, the level of logging (e.g., types of data to be logged, and the like) can be specified using configuration settings in the client-side proxy 175 and/or the server-side proxy 125. Various data relating to bytes and transactions, network connectivity, power, subscriber count, and the like may be logged, and/or processed using default (or other) settings on a periodic (e.g., hourly, daily, and the like) basis.

Bytes and Transactions data may include a number of bytes transacted (both to and from), the total number of transactions between the client-side proxy 175 and each application, the client-side proxy 175 and the network (e.g., radio access network 112), the client-side proxy 175 and its cache, and the like. Network Connectivity data may include, for example, total time the device spends in "data connected" state (based on a two-state connectivity model), total number of transitions into the data connected state, the number of times the radio transitions into the data connected state due to a network request that was proxied through the client-side proxy 175, total time spent in the data connected state due to a network request that was proxied through the client-side proxy 175, the number of transitions into data connected mode saved by the client-side and/or server-side proxy system, the amount of time in data connected state saved by the client-side and/or server-side proxy system, simulated values for the previous four items, as if traffic proxied via client-side and/or server-side proxy system were the only traffic on the device. Network connectivity data can also include the amount of time taken to transition from an idle state to connected state (i.e., setup time), a baseline or a reference determined from a sample of setup times, and the like. Power-related data may include, for example, each one-percent (or any other percentage value) change in the battery level, the total time the device is powered on but not connected to a power source, and the like. Subscriber count data may include, for example, the number of new subscribers observed in a period and the number of active subscribers in the period. This data may be aggregated by the host server, for example. Reporting of the above data can be done based on variables such as network bearer type (e.g., all, mobile or Wi-Fi), category (e.g., all, device model or application name), time (e.g., hour, day or month), and the like, or combinations thereof.

Figure 1E:
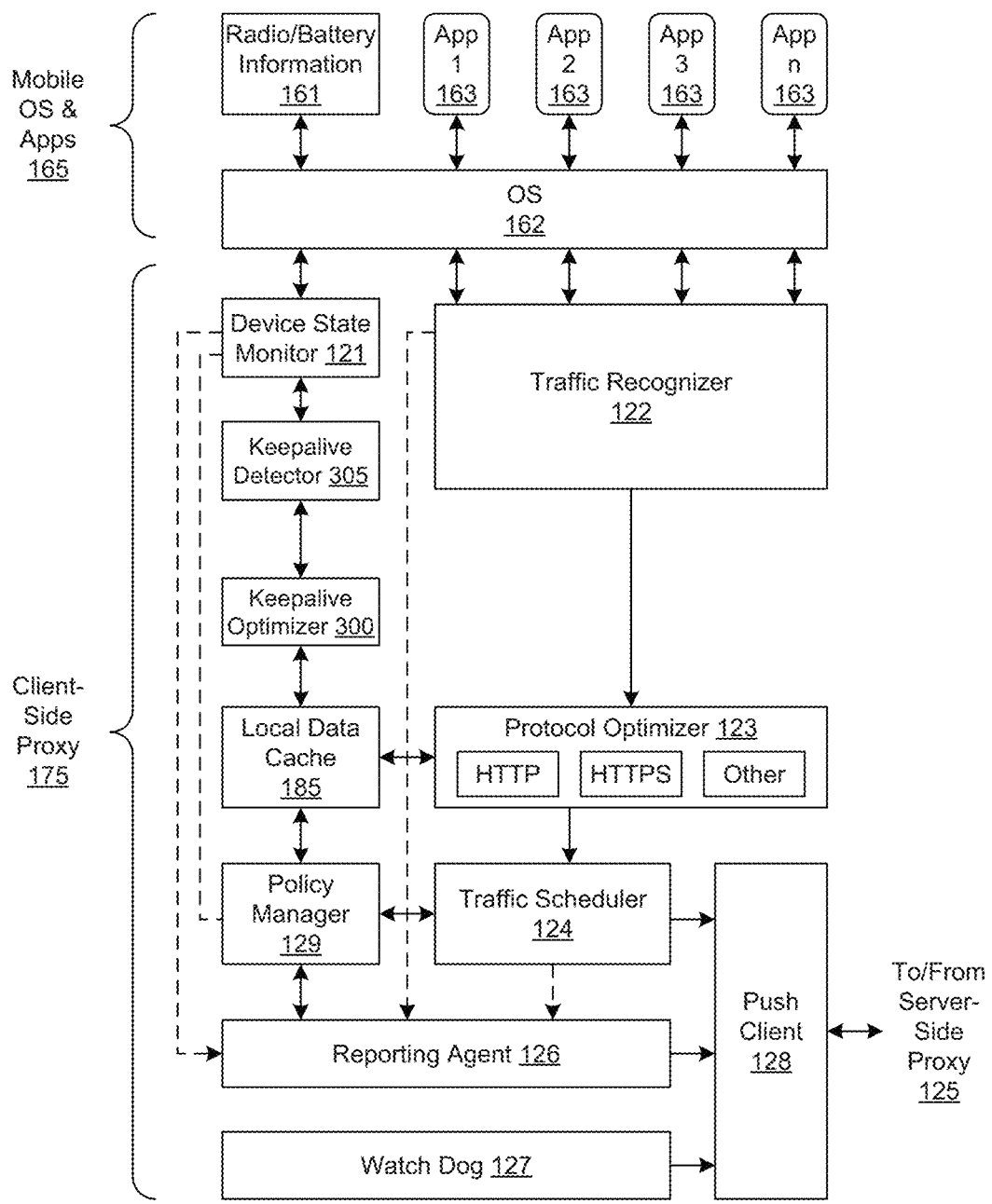
FIG. 1E depicts an example diagram showing the architecture of client side components in a distributed proxy and cache system.
Figure 1F:
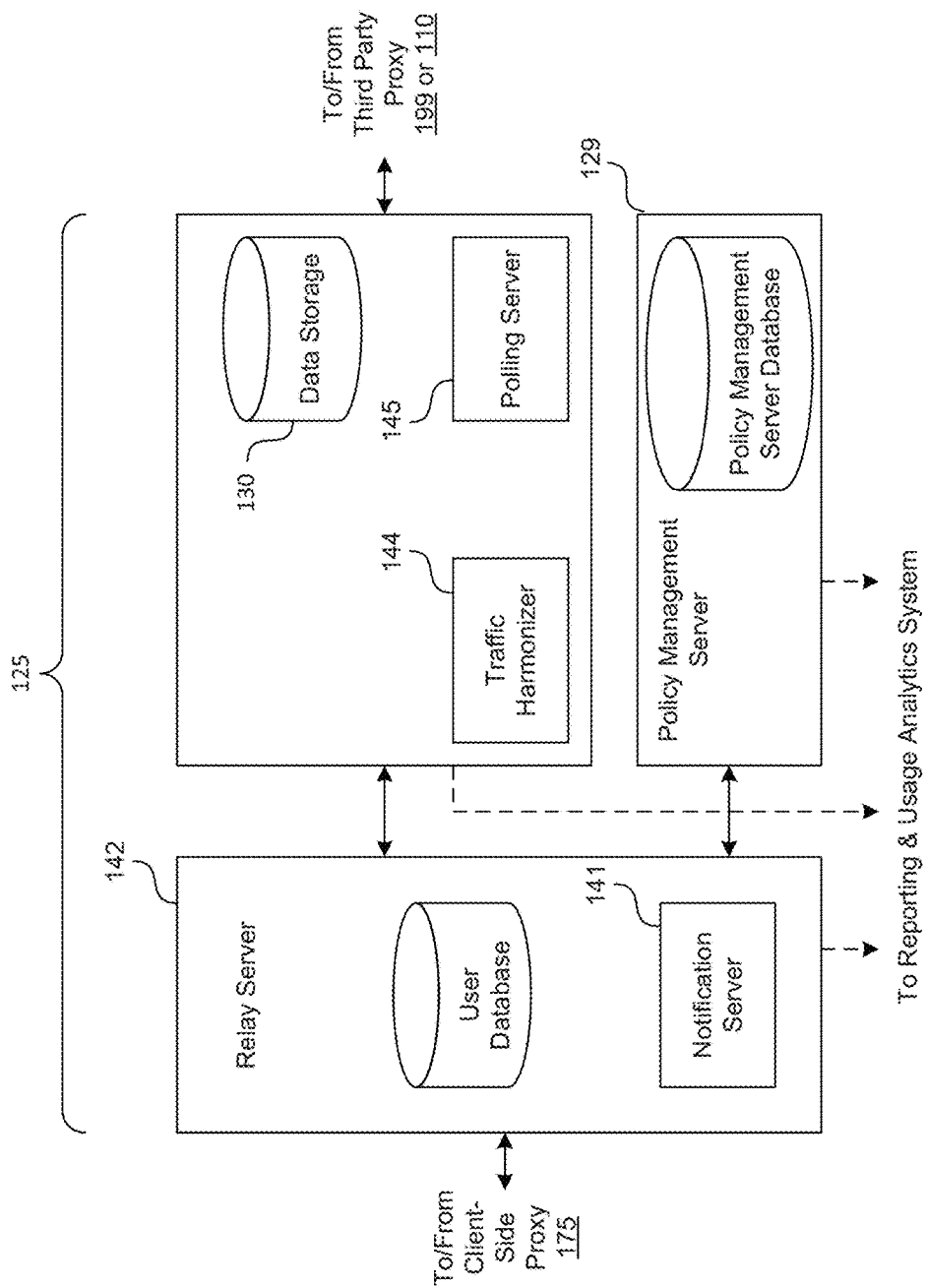
FIG. 1F depicts a diagram of the example components on the server side of the distributed proxy and cache system.

FIG. 1E illustrates an example diagram showing the architecture of client-side components in a distributed proxy and cache system having a keepalive optimizer for optimizing keepalive and other background traffic in a wireless network.

The client-side proxy 175 components can include software components or agents installed on the mobile device that enable traffic optimization and perform the related functionalities on the client side. Mobile OS and Apps 165 include components of the client side proxy 175 can operate transparently for end users and applications 163, and interface with the device's operating system (OS) 162. The client side proxy 175 can be installed on mobile devices for optimization to take place, and it can effectuate changes on the data routes and/or timing. Once data routing is modified, the client side proxy 175 can respond to application requests to service providers or host servers, in addition to or instead of letting those applications 163 access data network directly. In general, applications 163 on the mobile device will not notice that the client side proxy 175 is responding to their requests.

Some example components of the client side proxy 175 are described as follows:

Device State Monitor 121: The device state monitor 121 can be responsible for identifying several states and metrics in the device, such as network status (e.g., radio on/off status, connected to Wi-Fi, 2G, 3G or other mobile network), display status, battery level (e.g., via the radio/battery information 161), transparent mode status, etc., such that the remaining components in the client side proxy 175 can operate and make decisions according to device state, acting in an optimal way in each state.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent requests from the local cache 185 instead of allowing those request go over the network to the service provider/application host server. One of its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keepalive signaling so that some or all of the different applications 163 can send keepalive messages at the same time (traffic pipelining). Traffic scheduler 124 may also decide to delay transmission of data that is not relevant at a given time (for example, when the device is not actively used).

The keepalive detector 305: The keepalive detector 305 can detect keepalives based on various methodologies from the TCP stream to enable keepalive optimization, which can conserve resources on the mobile device and the network. In some embodiments, the keepalive detector 305 implementing the keepalive detection technology enables keepalives from applications to be detected in real-time, based on information related to the interval between data sent/received, size of the data sent/received, whether the data sent/received are associated with the same connection identifier, or the like. Various aspects of the keepalive detector 305 are described in detail with respect to FIG. 3.

The keepalive optimizer 300: Once the keepalives are detected by the keepalive detector, the keepalive optimizer 300 can optimize keepalive and other non-user interactive or background traffic using various methodologies. In one embodiment, the keepalive optimizer 300 can improve the efficiency of keepalive transactions and manage long-lived connections between mobile applications and associated application/host servers. For example, the keepalive optimizer 300 can manage long-lived connections with fewer keepalives, utilize radio-awareness, application behavior and/or device state to schedule transmission of keepalives and other background traffic, and the like. By performing these optimizations, the keepalive optimizer 300 can reduce unnecessary traffic in the mobile network, reduce battery resource consumption on mobile devices, save on bandwidth resource consumption and manage long-lived connections among others. Various aspects of keepalive optimization techniques of the keepalive optimizer 300 are described in detail in a related U.S. Provisional Patent Application Ser. No. 61/833,838 titled "KEEPALIVE ALGORITHMS FOR SIGNALING OPTIMIZATION IN A WIRELESS NETWORK FOR TRAFFIC UTILIZING PROPRIETARY AND NON-PROPRIETARY PROTOCOLS" filed on Jun. 11, 2013 and U.S. Provisional Patent Application Ser. No. 61/836,095 titled "ENGINEERING DELAY IN SENDING BACKGROUND REQUESTS FOR SIGNALING OPTIMIZATION IN A WIRELESS NETWORK FOR TRAFFIC UTILIZING PROPRIETARY AND NON-PROPRIETARY PROTOCOLS" filed on Jun. 17, 2013, the entire content of which are incorporated by reference herein.

Policy Manager 129: The policy manager 129 can store and enforce traffic optimization and reporting policies provisioned by a Policy Management Server (PMS). At the client side proxy 175 first start, traffic optimization and reporting policies (policy profiles) that are to be enforced in a particular device can be provisioned by the Policy Management Server. Enforcing traffic management policies at the device's IP layer lets an operator manage traffic before it uses radio accessed network resources. Policy usage can range from creating highly targeted subscriber plans to proactively and/or reactively managing network congestion. In one implementation, the conditions for selecting a policy for enforcement, and/or conditions for dropping an implemented policy, may be managed or coordinated by the policy manager 129. For example, in some embodiments, the policy manager 129 can manage and implement keepalive and other background traffic optimization policies such as blocking policies, delaying policies, transmission policies, and/or the like configured and provisioned by the PMS. For example, the PMS can have two policy configurations for optimizing background requests: (1) true to enable the optimization and false to disable the optimization and (2) length of delay cycle to be applied if there is no other event triggering undelay. Similarly, the PMS can provide and the policy manager 129 can implement other configurations for various components of the keepalive optimizer 300. In one embodiment, the policy manager 129 can receive and implement a policy configuration from the PMS to enable or disable the keepalive optimizer 300 and/or the keepalive detector 305 at an application level or at a user or device level. In some embodiments, the policy manager 129 can also receive and manage configuration parameters or settings for detecting keepalives by the keepalive detector 305.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information (e.g., logs) about the events taking place in the device and send the information to the log storage and processing service 174, which collects and stores client-side and/or server-side proxy system logs. Event details are stored temporarily in the device and transferred to log storage and processing service 174 only when the data channel state is active. If the client side proxy 175 does not send records within a period of time (e.g., twenty-four hours), the reporting agent 126 may, in one embodiment, attempt to open the connection and send recorded entries or, in case there are no entries in storage, an empty reporting packet. All reporting settings may be configured in the policy management server (PMS). The information in the logs may be used for reporting and/or troubleshooting, for example.

Push Client 128: The push client 128 can be responsible for the traffic between the server side proxy 125 and the client side proxy 175. The push client 128 can send out service requests like content update requests and policy update requests, and can receive updates to those requests from the server side proxy 125. In addition, push client 128 can send data to a log storage and processing service 174, which may be internal to or external to the server side proxy 125.

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 2A:
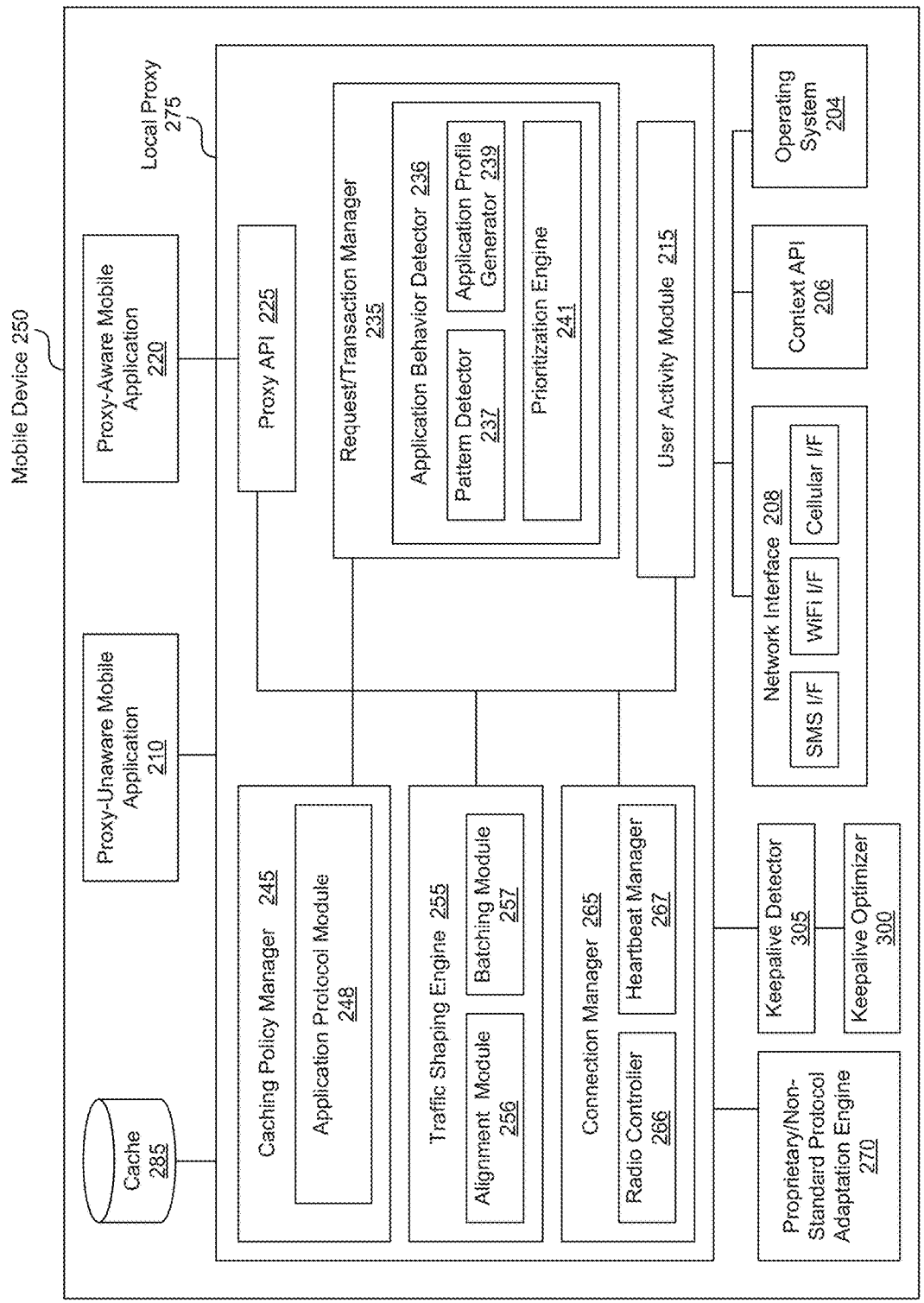
FIG. 2A depicts a block diagram illustrating another example of client-side components in a distributed proxy and cache system, further including a keepalive detector that can identify keepalives from a TCP stream.

FIG. 2A depicts a block diagram illustrating another example of client-side components in a distributed proxy and cache system, further including a keepalive detector that can identify keepalives from a TCP stream. The client-side components in a distributed proxy and cache system can reside on a mobile device (e.g., wireless device) 250 that manages traffic in a wireless network (or broadband network) for keepalive detection, keepalive optimization, signaling optimization, resource conservation, content caching, and/or traffic management.

Figure 2B:
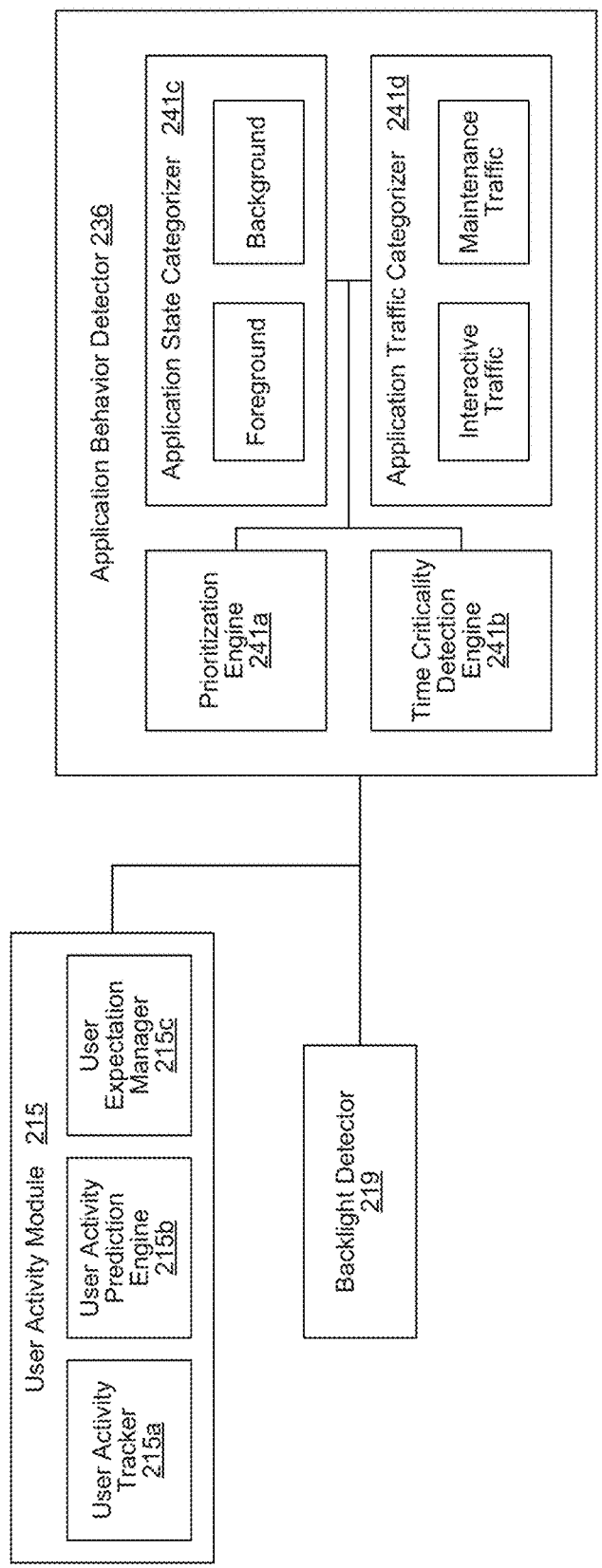
FIG. 2B depicts a block diagram illustrating additional components in the local proxy shown in the example of FIG. 2A.

FIG. 2B depicts a block diagram illustrating additional components in the local proxy shown in the example of FIG. 2A which is further capable of performing mobile traffic categorization and management based on application behavior and/or user activity.

The mobile device 250, which can be a device that is portable or mobile (e.g., any wireless device, e.g., mobile device 150 from FIG. 1B-1E), such as a portable phone, generally includes, for example, a network interface 208, an operating system 204, a context API 206, and mobile applications which may be proxy-unaware 210 or proxy-aware 220. Note that while the client device 250 is specifically illustrated in the example of FIG. 2A as a mobile device, such depiction is not a limitation, and mobile device 250 may be any wireless, broadband, portable/mobile or non-portable device able to receive and/or transmit signals to satisfy data requests over a network including wired or wireless networks (e.g., Wi-Fi, cellular, Bluetooth, LAN, WAN, and the like).

The network interface 208 can be a networking module that enables the device 250 to mediate data in a network with an entity that is external to the mobile device 250, through any known and/or convenient communications protocol supported by the mobile device and the external entity. The network interface 208 can include one or more of a network adaptor card, a wireless network interface card (e.g., SMS interface, Wi-Fi interface, interfaces for various generations of mobile communication standards including but not limited to 2G, 3G, 3.5G, 4G, LTE, etc.), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266, a heartbeat manager 267, a keepalive detector 305 and a keepalive optimizer 300. The request/transaction manager 235 can further include an application behavior detector 236 having a prioritization engine 241, a pattern detector 237, an application profile generator 239, a time criticality detection engine 242, an application state categorizer 243 and an application traffic categorizer 244. In one embodiment, the local proxy or the device can further include a proprietary/ non-standard protocol adaptation engine 270 for optimizing traffic in a protocol agnostic manner.

Additional or less components/modules/engines can be included in the local proxy 275 and each illustrated component.

As used herein, a "module," "manager," "handler," "detector," "optimizer," "interface," "controller," "normalizer," "generator," "invalidator," or "engine" includes a general purpose, dedicated or shared processor and, typically, firmware or software modules that are executed by the processor. Depending upon implementation-specific or other considerations, the module, manager, handler, detector, optimizer, interface, controller, normalizer, generator, invalidator, or engine can be centralized or its functionality distributed. The module, manager, handler, detector, optimizer, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for mobile traffic management resides in or is in communication with the mobile device 250, including local proxy 275 (mobile client) and/or cache 285. The local proxy 275 can provide an interface on the mobile device 250 for users to access device applications and services including email, IM, voice mail, visual voicemail, feeds, Internet, games, productivity tools, or other applications, etc.

The local proxy 275 is generally application independent and can be used by applications (e.g., both proxy-aware and proxy-unaware applications 210 and 220 and other mobile applications) to open TCP (Transport Control Protocol) or other protocol based connections to a remote server (e.g., the server 100 in the examples of FIGS. 1B-1C and/or server proxy 125 shown in the examples of FIG. 1B). In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, and the like. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the mobile device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo., 2 mo., etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser or any other type of application) has been exited, closed, minimized, maximized, opened, moved into the foreground or into the background, multimedia content playback, etc.

In one embodiment, characteristics of the user activity on the device 250 can be used to locally adjust behavior of the device (e.g., mobile device or any wireless device) to optimize its resource consumption such as battery/power consumption and more generally, consumption of other device resources including memory, storage, and processing power, and/or further optimize signaling in the network. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, a wireless device, or a non-portable device) or server (e.g., host server 100 in the examples of FIG. 1B-1C) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed, data, or data of a certain level of importance becomes available, etc.).

In one embodiment, the user activity module 215 can, in response to determining that user activity characteristics indicate that a user is active after a period of inactivity, request that a remote device (e.g., server host server 100 or the network-side proxy 125 in the examples of FIG. 1B-1C) send the data that was buffered as a result of the previously decreased communication frequency.

In addition, or in alternative, the local proxy 275 can communicate the characteristics of user activity at the device 250 to the remote device (e.g., host server 100 or the network-side proxy 125 in the examples of FIGS. 1B-1C) and the remote device determines how to alter its own communication frequency with the device 250 for network resource conservation and conservation of resources of the mobile device 250.

One embodiment of the local proxy 275 further includes a request/transaction manager 235, which can detect, identify, intercept, process and manage data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user-initiated action on the device (e.g., user interaction with an application (e.g., a mobile application)). In general, a time critical transaction can include a transaction resulting from a user-initiated data transfer, and can be prioritized as such. Transaction characteristics can also depend on the amount of data that will be transferred or is anticipated to be transferred as a result of the requested transaction. For example, the connection manager 265 can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or additionally be set by the particular application; for example, the Facebook application (e.g., a mobile application) can set its own priorities for various transactions (e.g., a status update can be of higher priority than an add friend request or a poke request; a message send request can be of higher priority than a message delete request), or an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user can in general set priorities at different tiers, such as, specific priorities for sessions, or types, or applications (e.g., comparing a browsing session, a gaming session, and an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE 1

| Change (initiated on device) | Priority | Change (initiated on server) | Priority |
| --- | --- | --- | --- |
| Send email | High | Receive email | High |
| Delete email | Low | Edit email | Often not possible to sync (Low if possible) |
| (Un)read email | Low | | |
| Move message | Low | | |
| Read more | High | | |
| Download attachment | High | New email in deleted items | Low |
| | | Delete an email | Low |
| New Calendar event | High | (Un)Read an email | Low |
| Edit/change Calendar event | High | Move messages | Low |
| | | Any calendar change | High |
| Add a contact | High | Any contact change | High |
| Edit a contact | High | Wipe/lock device | High |
| Search contacts | High | Settings change | High |
| Change a setting | High | Any folder change | High |
| Manual send/receive | High | Connector restart | High (if no changes nothing is sent) |
| IM status change | Medium | | |
| Auction outbid or change notification | High | | |
| | | Social Network Status Updates | Medium |
| Weather Updates | Low | Severe Weather Alerts | High |
| | | News Updates | Low |

Table 1 above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include updating message status as being read, unread, deleting of messages, deletion of contacts; higher priority requests/transactions can, in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages) are generally considered low priority and, absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate deletion of the message from the device 250 the moment that the message has exceeded 7 days old, the message is deleted when the radio is powered on next. If the radio is already on, then pruning may occur as regularly scheduled.

The request/transaction manager 235 can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such that a request can be sent when a request for a transaction is detected to be over a certain priority level.

In one embodiment, priority assignments (such as that determined by the local proxy 275 or another device/entity) can be used to cause a remote device to modify its communication with the frequency with the mobile device or wireless device. For example, the remote device can be configured to send notifications to the device 250 when data of higher importance is available to be sent to the mobile device or wireless device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table 3 in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the accumulated low priority events when a higher priority event is initiated or detected at the device 250. Batch transfer can otherwise be initiated when radio use is triggered for another reason (e.g., to receive data from a remote device such as host server 100, server-side proxy 125). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

Figure 4A:
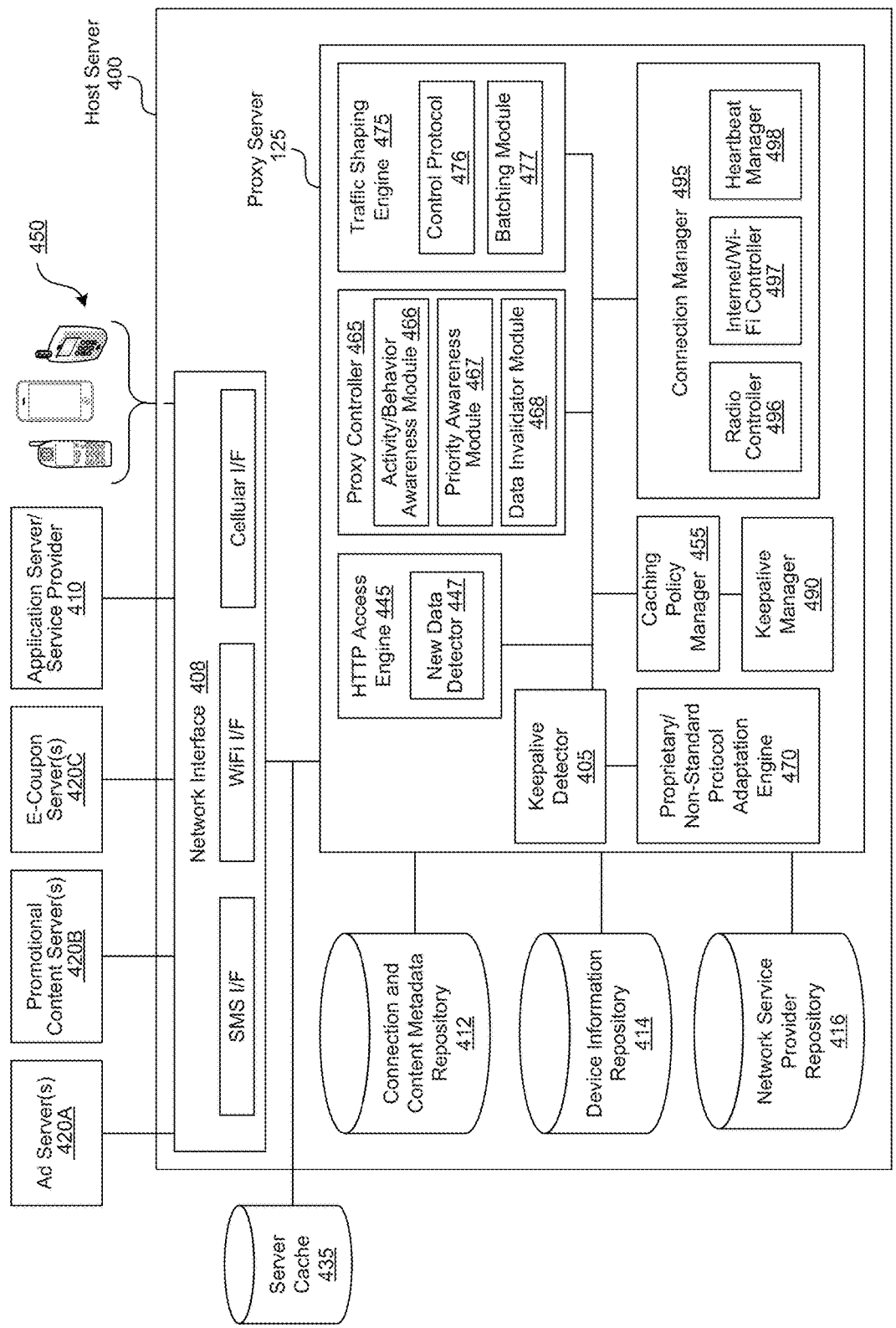
FIG. 4A depicts a block diagram illustrating an example of server-side components in a distributed proxy and cache system, further including a keepalive detector that can identify keepalives from a TCP stream and a proprietary/non-standard protocol adaptation engine.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100 as shown in FIG. 1B, the host server 400 as shown in FIG. 4A or a content provider/application server such as the server/provider 110 shown in the examples of FIGS. 1B-1C). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 235 intercepts a data request by an application on the device 250, the local cache repository 285 can be queried to determine if there is any locally stored response, and also determine whether the response is valid. When a valid response is available in the local cache 285, the response can be provided to the application on the device 250 without the device 250 needing to access the cellular network or wireless broadband network.

If a valid response is not available, the local proxy 275 can query a remote proxy (e.g., the server proxy 125 of FIG. 4A) to determine whether a remotely stored response is valid. If so, the remotely stored response (e.g., which may be stored on the server cache 135 or optional caching server 199 shown in the example of FIG. 1C) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, can send the data request to a remote proxy (e.g., server proxy 125 of FIG. 4A) which forwards the data request to a content source (e.g., application server/content provider 110 of FIG. 1B), and a response from the content source can be provided through the remote proxy, as will be further described in the description associated with the example host server 400 of FIG. 4A. The cache policy manager 245 can manage or process requests that use a variety of protocols, including but not limited to HTTP, HTTPS, IMAP, POP, SMTP, XMPP, and/or ActiveSync. The caching policy manager 245 can locally store responses for data requests in the local database 285 as cache entries, for subsequent use in satisfying same or similar data requests.

The caching policy manager 245 can request that the remote proxy monitor responses for the data request and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, etc.) to the data request. In one embodiment, the caching policy manager 245 is able to detect or identify the protocol used for a specific request, including but not limited to HTTP, HTTPS, IMAP, POP, SMTP, XMPP, and/or ActiveSync. In one embodiment, application specific handlers (e.g., via the application protocol module 248 of the caching policy manager 245) on the local proxy 275 allows for optimization of any protocol that can be port mapped to a handler in the distributed proxy (e.g., port mapped on the proxy server 125 in the example of FIG. 4A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/ changed data is not available, thus freeing up network resources and preventing network congestion.

In one embodiment, the local proxy 275 includes an application behavior detector 236 to track, detect, observe, and/or monitor applications (e.g., proxy-aware and/or unaware applications 210 and 220) accessed or installed on the device 250. Application behaviors or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module 256 can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), device (e.g., mobile or wireless device) parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1B) that would result from the application requests that would be performed at the mobile device or wireless device 250 to be performed instead by a proxy server (e.g., proxy server 125 of FIG. 1C) remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250 when content change is not detected in the polling of the content sources. As such, when data has not changed, application data needs can be satisfied without needing to enable radio use or occupying cellular bandwidth in a wireless network. When data has changed and/or new data has been received, the remote entity (e.g., the host server) to which polling is offloaded, can notify the device 250.

In one embodiment, the local proxy 275 can mitigate the need/use of periodic keepalive messages (heartbeat messages) to maintain TCP/IP connections, which can consume significant amounts of power thus having detrimental impacts on mobile device battery life. The connection manager 265 in the local proxy (e.g., via the heartbeat manager 267, the keepalive detector 305 and/or the keepalive optimizer 300) can detect, identify, and intercept any or all heartbeat (keepalive) messages being sent from applications.

The heartbeat manager 267 can prevent any or all of these heartbeat messages from being sent over the cellular, or other network, and instead rely on the server component of the distributed proxy system (e.g., shown in FIG. 1C) to generate and send the heartbeat messages to maintain a connection with the backend (e.g., application server/provider 110 in the example of FIG. 1B).

In some embodiments, the radio state management engine 203 can perform the management and/or policy management of mobile device radio state promotion or demotion based on buffer, activity and/or device state monitoring. The radio state management engine 203 can determine what user activity and/or data activity should justify a radio state promotion and communicate the information to the network to be implemented as a single session, multi-session, or global policy. This policy can be used to execute the appropriate level of throttling to prevent the radio from going to higher powered states when unjustified based on dynamic conditions (e.g., network status, traffic, congestion, user expectations, user behavior, other activity, and the like.).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

FIG. 2B depicts a block diagram illustrating additional components in the local proxy shown in the example of FIG. 2A.

One embodiment of the local proxy 175 includes the user activity module 215, which further includes one or more of, a user activity detector/tracker 215a, a user activity prediction engine 215b, and/or a user expectation manager 215c. The application behavior detector 236 can further include a prioritization engine 241a, a time criticality detection engine 241b, an application state categorizer 241c, and/or an application traffic categorizer 241d. The local proxy 175 can further include a backlight detector 219.

In one embodiment, the application behavior detector 236 may detect, determine, identify, or infer the activity state of an application on the mobile device 250 from which traffic has originated or is directed to, for example, via the application state categorizer 241c and/or the application traffic categorizer 241d. The activity state can be determined based on whether the application is in a foreground or background state on the mobile device (via the application state categorizer 241c) since the traffic for a foreground application versus a background application may be handled differently.

In one embodiment, the activity state can be determined, detected, identified, or inferred with a level of certainty of heuristics, based on the backlight status of the mobile device 250 (e.g., by the backlight detector 219) or other software agents or hardware sensors on the mobile device, including but not limited to, resistive sensors, capacitive sensors, ambient light sensors, motion sensors, touch sensors, and the like. In general, if the backlight is on, the traffic can be treated as being or determined to be generated from an application that is active or in the foreground, or the traffic is interactive. In addition, if the backlight is on, the traffic can be treated as being or determined to be traffic from user interaction or user activity, or traffic containing data that the user is expecting within some time frame.

In one embodiment, the activity state is determined based on whether the traffic is interactive traffic or maintenance traffic. Interactive traffic can include transactions from responses and requests generated directly from user activity/interaction with an application, and can include content or data that a user is waiting or expecting to receive. Maintenance traffic may be used to support the functionality of an application which is not directly detected by a user. Maintenance traffic can also include actions or transactions that may take place in response to a user action, but the user is not actively waiting for or expecting a response.

For example, a mail or message delete action at a mobile device 250 generates a request to delete the corresponding mail or message at the server, but the user typically is not waiting for a response. Thus, such a request may be categorized as maintenance traffic, or traffic having a lower priority (e.g., by the prioritization engine 241a) and/or is not time-critical (e.g., by the time criticality detection engine 241b).

Contrastingly, a mail 'read' or message 'read' request initiated by a user at the mobile device 250, can be categorized as 'interactive traffic' since the user generally is waiting to access content or data when they request to read a message or mail. Similarly, such a request can be categorized as having higher priority (e.g., by the prioritization engine 241a) and/or as being time critical/time sensitive (e.g., by the time criticality detection engine 241b).

The time criticality detection engine 241b can generally determine, identify, infer the time sensitivity of data contained in traffic sent from the mobile device 250 or to the mobile device from a host server (e.g., host 300) or application server (e.g., app server/content source 110). For example, time sensitive data can include, status updates, stock information updates, IM presence information, email messages or other messages, actions generated from mobile gaming applications, webpage requests, location updates, etc. Data that is not time sensitive or time critical, by nature of the content or request, can include requests to delete messages, mark-as-read or edited actions, application-specific actions such as an add-friend or delete-friend request, certain types of messages, or other information which does not frequently change in nature, etc. In some instances when the data is not time critical, the timing with which to allow the traffic to pass through is set based on when additional data needs to be sent from the mobile device 250. For example, traffic shaping engine 255 can align the traffic with one or more subsequent transactions to be sent together in a single power-on event of the mobile device radio (e.g., using the alignment module 256 and/or the batching module 257). The alignment module 256 can also align polling requests occurring close in time directed to the same host server, since these requests are likely to be responded to with the same data. In some instances, the timing for withholding or delaying traffic and timing for allowing any delayed or new traffic to the network can be based on traffic management policies.

In the alternate or in combination, the activity state can be determined from assessing, determining, evaluating, inferring, identifying user activity at the mobile device 250 (e.g., via the user activity module 215). For example, user activity can be directly detected and tracked using the user activity tracker 215a. The traffic resulting therefrom can then be categorized appropriately for subsequent processing to determine the policy for handling. Furthermore, user activity can be predicted or anticipated by the user activity prediction engine 215b. By predicting user activity or anticipating user activity, the traffic thus occurring after the prediction can be treated as resulting from user activity and categorized appropriately to determine the transmission policy.

In addition, the user activity module 215 can also manage user expectations (e.g., via the user expectation manager 215c and/or in conjunction with the activity tracker 215a and/or the prediction engine 215b) to ensure that traffic is categorized appropriately such that user expectations are generally met. For example, a user-initiated action should be analyzed (e.g., by the expectation manager 215c) to determine or infer whether the user would be waiting for a response. If so, such traffic should be handled under a policy such that the user does not experience an unpleasant delay in receiving such a response or action.

In one embodiment, an advanced generation wireless standard network is selected for use in sending traffic between a mobile device and a host server in the wireless network based on the activity state of the application on the mobile device for which traffic is originated from or directed to. An advanced technology standard such as the 3G, 3.5G, 3G+, 4G, or LTE network can be selected for handling traffic generated as a result of user interaction, user activity, or traffic containing data that the user is expecting or waiting for. Advanced generation wireless standard networks can also be selected to transmit data contained in traffic directed to the mobile device which responds to foreground activities.

In categorizing traffic and defining a transmission policy for mobile traffic, a network configuration can be selected for use (e.g., by a network configuration selection engine) on the mobile device 250 in sending traffic between the mobile device and a proxy server and/or an application server (e.g., app server/host 110). The network configuration that is selected can be determined based on information gathered by the application behavior module 236 regarding application activity state (e.g., background or foreground traffic), application traffic category (e.g., interactive or maintenance traffic), any priorities of the data/content, time sensitivity/criticality.

Figure 2C:
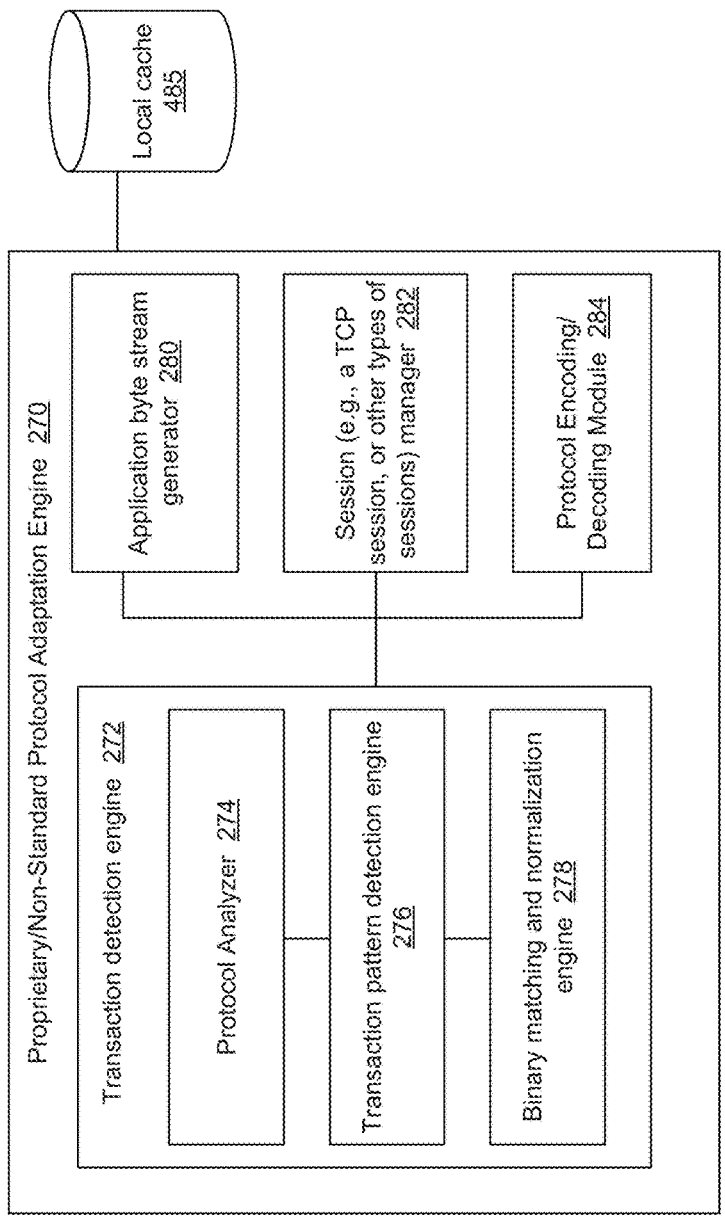
FIG. 2C depicts a block diagram illustrating additional components in the proprietary/non-standard protocol adaptation engine shown in the example of FIG. 2A.
Figure 3:
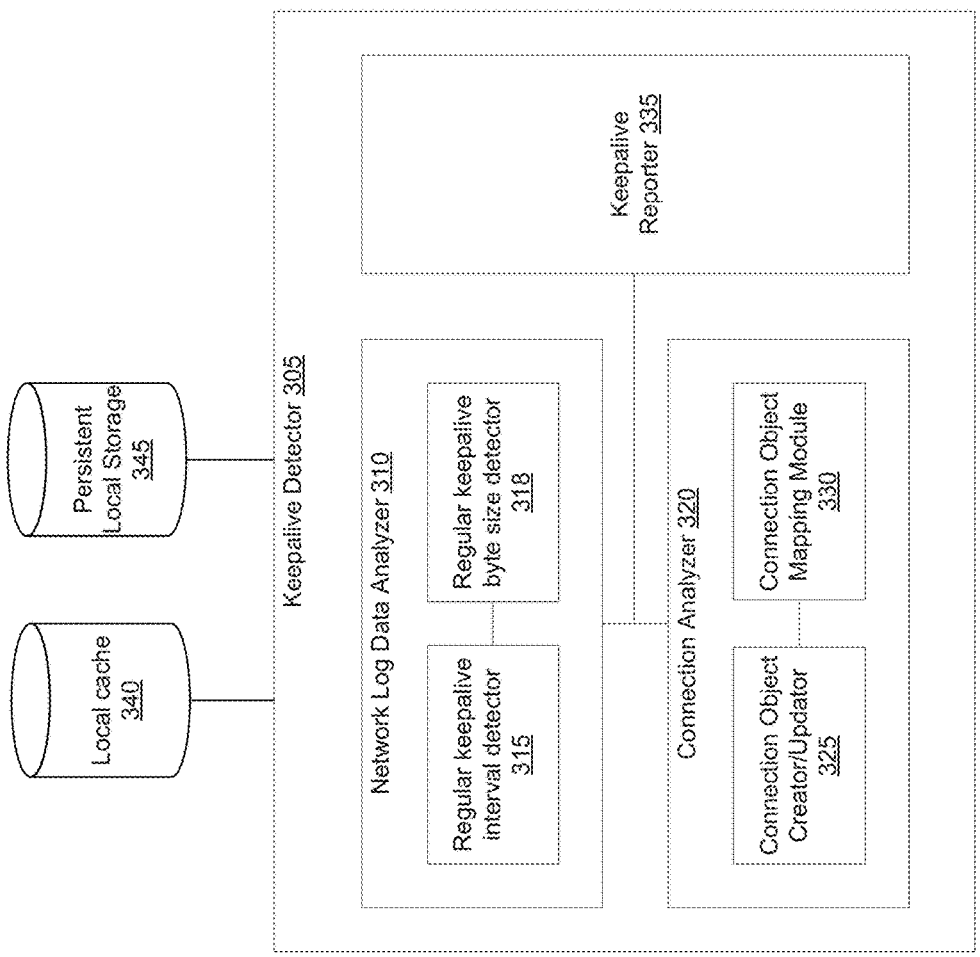
FIG. 3 depicts a block diagram illustrating additional components in the keepalive detector shown in the example of FIG. 2A.

In one embodiment, the keepalive detector 305 which is described in detail with respect to FIG. 3 can also detect or identify keepalives or heartbeat messages and the keepalive optimizer 300 can use the information to reduce or block keepalive and other background traffic in the mobile network FIG. 2C depicts a block diagram illustrating additional components in the proprietary/non-standard protocol adaptation engine shown in the example of FIG. 2A. In one embodiment, the proprietary/non-standard protocol adaptation engine 270 can be a part of the local proxy 275. Alternately, the proprietary/non-standard protocol adaptation engine 270 can be implemented separately outside of the local proxy 275.

The proprietary/non-standard protocol adaptation engine 270 can include, for example, a transaction detection engine 272 having a protocol analyzer 274, a transaction pattern detection engine 276, a binary matching and normalization engine 278, an application byte stream generator 280, a TCP session manager 282 and/or a protocol encoding/decoding module 284. Additional or less modules/engines can be included. The various components of the proprietary/non-standard protocol adaptation engine 401 on the mobile device or user equipment (UE) 250 can singularly or in any combination perform the following functions and features related to signaling optimization in a wireless network for traffic utilizing proprietary and nonproprietary protocols.

In one embodiment, the local proxy 275 or the proprietary/non-standard protocol adaptation engine 401 captures the TCP stream from an application and passes it on as a byte stream via a byte stream interface provided by the application byte stream generator 280. A byte stream can be read from or can be written to by an application or client without having to account for protocol-specific formatting, sizing, and other details.

The TCP session manager 282 can, in one embodiment, manage TCP sessions including establishing of TCP sessions with a proxy server (e.g., proxy server 125) and/or the content server (e.g., content server 110) and tearing down or termination of TCP sessions. Although the discussion is with respect to TCP sessions, other similar or session-based protocols may be implemented. In one implementation, the TCP session manager 282 can establish a first TCP session between an application and the local proxy 275 or the proprietary/non-standard protocol adaptation engine 270. The TCP session manager 282 can also establish a TCP session between the local proxy 275 (or the proprietary/non-standard protocol adaptation engine 270) and a server (e.g., proxy server 125, an application or content server 110). Byte streams from the application can be passed over the first TCP session to the keepalive detector 305 and/or the keepalive optimizer 300, which can then be sent over to the server over the second TCP session. The TCP session manager 282 may also allow the application to establish the necessary handshakes.

In one embodiment, the transaction detection engine 272 can detect and identify transactions based on analysis of the protocol headers and other protocol peculiarities. Such protocol specific analysis can be performed by a protocol analyzer 274. For example, the protocol analyzer 274 can detect transactions in HTTP protocol based on HTTP header, formatting, encoding, and the like.

In another embodiment, the transaction detection engine 272 can be protocol agnostic, and can detect and/or identify transactions without knowing or understanding details of the underlying protocols. For example, the transaction detection engine 272 can directly monitor byte streams captured from applications (e.g., by the application byte stream generator 280 interface) and detect and/or identify transactions based on observed and/or extracted patterns of byte streams and/or matching or determining content in byte streams. In one implementation, for example, the transaction pattern detection engine 276 can monitor, detect and/or extract various patterns embedded in byte streams corresponding to transactions from applications. One such pattern can be idle time between transactions. The pattern detection engine 276 can monitor byte streams from an application over time, and detect an idle time of two minutes occurring in between transactions, without knowing or understanding the details of the protocol used by the application. Other patterns that can be identified or extracted can resemble those identified by the distributed proxy system (e.g., the local proxy 275 and/or the proxy server 125) for HTTP or other standard protocols.

In one embodiment, the proprietary/non-standard protocol adaptation engine 401 can include a protocol encoding/decoding module 284. In implementations where a binary stream is encapsulated within a security and/or encryption protocol such as Transport Layer Security (TLS), Secure Sockets Layer (SSL), and the like, the encoding/decoding module may include capabilities for decoding such protocols to extract the binary stream.

FIG. 3 depicts a block diagram illustrating additional components in the keepalive detector 305 shown in the example of FIG. 2A. In some embodiments, the keepalive detector 305 can include a network log data analyzer 310 having a regular keepalive interval detector 315 and a regular keepalive byte size detector 315 and a keepalive reporter 335. In some other embodiments, the keepalive detector 305 can include a connection analyzer 320 having a connection object creator/updator module 325 and a connection object mapping module 330 and a keepalive reporter 335. In yet other embodiments, the keepalive detector can include the network log data analyzer 310, the connection analyzer 320 and the keepalive reporter 335.

The network log data analyzer 310 can examine patterns of data sent from and received by a mobile application on a mobile device. Such patterns of data sent from and received by the mobile application can have variable intervals and sizes which introduce ambiguities regarding whether such data are related to keepalives or not. In order to remove the ambiguities, the network log data analyzer 310 can use the regular keepalive interval detector 315 and the regular keepalive byte size detector 318 to perform statistical analyses on the patterns of data sent from and received by the mobile application to detect a pattern that is regular and to detect regular byte sizes respectively. The network log data analyzer 310 can then identify the keepalives from the TCP stream occurring over the same TCP session based on information relating to the pattern that is detected as regular and the regular byte sizes.

In some embodiments, the regular keepalive interval detector 315 can detect the pattern as regular when (1) the pattern occurs more than a minimum number of times during a duration (e.g., more than 5 times an hour); (2) intervals between occurrences of the pattern is distributed such that a difference between an interval in a first quartile and an interval in a third quartile is within a threshold percentage of a median of the intervals or a variance of intervals between a threshold number of sequential occurrences of the pattern is less than a maximum threshold as determined by the regular keepalive interval detector 315; and (3) the pattern's median of the intervals is greater than a minimum threshold. In some embodiments, all three conditions need not be satisfied for the pattern to be detected as regular.

The regular keepalive byte size detector 318 can detect the regular byte sizes when patterns including same sizes of data sent from and received by the mobile application, same sizes of data sent from the mobile application or same sizes of data received by the mobile application are detected as regular. In further embodiments, the regular byte size can be detected by the detector 318 by performing a cluster analysis to identify patterns including data sent from and received by the mobile application, data sent from the mobile application or data received by the mobile application having a variance in sizes that is less than a threshold that are detected as regular. The logic flow diagrams of FIGS. 5-8 describe various aspects of the network log data analyzer 310 and its components.

The connection analyzer 320 can, in some embodiments, detect keepalives or network transactions from stream data on a mobile device. The connection analyzer 320 can detect a message including stream data for a socket. Based on information in the message, the connection object creator/updator 325 can determine whether to create or update a connection object. For example, the connection object creator/updator 325 can analyze the message to determine time the socket was created and create the connection object when the socket was created was more than an amount of given time ago. Similarly, the connection object creator/updator 325 can analyze the message to determine the information including an amount of data transferred from a client to a server and from the server to the client and timing characteristics and update the connection object when the amount of data transferred is less than a threshold amount and the timing characteristics indicates that a time interval since the last data transfer event occurred more than a threshold interval.

The connection object is associated with a data structure that includes an identifier for the connection object, time the socket was created, a keepalive weight that is initialized to a value on creation of the connection object and incremented each time the connection object is updated, a flag for indicating whether the keepalive was detected and a flag indicating whether the message contains a keepalive. The connection object including the associated data structure can be stored in the local cache 340 or the persistent local storage 345. The connection object creator/updator 325 can further evaluate the connection object to determine whether a keepalive is detected and update the corresponding flag in the keepalive data structure. The evaluation can include evaluating the keepalive weight of the connection object upon updating the connection object to determine whether the keepalive weight is higher than a threshold.

The keepalive reporter 335 can report changes to the connection object including a formatted form of the data structure to the server.

In some embodiments, the keepalive detector 305 can identify network transactions (e.g., keepalives) from a Transport Control Protocol (TCP) stream by obtaining one or more network transaction parameters determined from examination of patterns of data sent from and received by a mobile application on a mobile device and identifying the network transactions from the TCP stream based on the one or more network transaction parameters. The network transactions occur over the same TCP session and are proxy streamed. In some embodiments, the one or more network transaction parameters include a regular interval, a regular size threshold that is determined from the patterns of data sent from and received by the mobile application based on statistical analysis, similar or repeating content within the patterns of data sent from and received by the mobile application, content following a certain pattern or a combination thereof. The repeating content in the network transactions can have parts or portions that are the same or can have some portions that follow a pattern (e.g., a counter or incrementing or decrementing pattern, time stamp). In some embodiments, the patterns of data sent from and received by the mobile application are recorded in a network communication log along with patterns of data sent from and received by other mobile applications on the mobile device. The network transaction parameters can be determined locally on the mobile device (e.g., via the network log data analyzer 310) or remotely on a proxy server (e.g., via the network log data analyzer 430).

FIG. 4A depicts a block diagram illustrating an example of server-side components in a distributed proxy and cache system, further including a keepalive detector that can identify keepalives from a TCP stream and a proprietary/non-standard protocol adaptation engine. In some embodiments, the server-side proxy (or proxy server 125) can further categorize mobile traffic and/or deploy and/or implement policies such as traffic management and delivery policies based on device state, application behavior, content priority, user activity, and/or user expectations.

The host server 400 generally includes, for example, a network interface 408 and/or one or more repositories 412, 414, and 416. Note that server 400 may be any portable/mobile or non-portable device, server, cluster of computers and/or other types of processing units (e.g., any number of a machine shown in the example of FIG. 1B) able to receive or transmit signals to satisfy data requests over a network including any wired or wireless networks (e.g., Wi-Fi, cellular, Bluetooth, etc.).

The network interface 408 can include networking module(s) or devices(s) that enable the server 400 to mediate data in a network with an entity that is external to the host server 400, through any known and/or convenient communications protocol supported by the host and the external entity. Specifically, the network interface 408 allows the server 400 to communicate with multiple devices including mobile phone devices 450 and/or one or more application servers/content providers 410.

The host server 400 can store information about connections (e.g., network characteristics, conditions, types of connections, etc.) with devices in the connection metadata repository 412. Additionally, any information about third-party applications or content providers can also be stored in the repository 412. The host server 400 can store information about devices (e.g., hardware capability, properties, device settings, device language, network capability, manufacturer, device model, OS, OS version, etc.) in the device information repository 414. Additionally, the host server 400 can store information about network providers and the various network service areas in the network service provider repository 416.

The communication enabled by network interface 408 allows for simultaneous connections (e.g., including cellular connections) with devices 450 and/or connections (e.g., including wired/wireless, HTTP, Internet connections, LAN, WiFi, etc.) with content servers/providers 410 to manage the traffic between devices 450 and content providers 410, for optimizing network resource utilization and/or to conserver power (battery) consumption on the serviced devices 450. The host server 400 can communicate with mobile devices 450 serviced by different network service providers and/or in the same/different network service areas. The host server 400 can operate and is compatible with devices 450 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 5G (IMT-advanced), etc.

In general, the network interface 408 can include one or more of a network adaptor card, a wireless network interface card (e.g., SMS interface, WiFi interface, interfaces for various generations of mobile communication standards including but not limited to 1G, 2G, 3G, 3.5G, 5G type networks such as LTE, WiMAX, etc.), Bluetooth, WiFi, or any other network whether or not connected via a router, an access point, a wireless router, a switch, a multilayer switch, a protocol converter, a gateway, a bridge, a bridge router, a hub, a digital media receiver, and/or a repeater.

The host server 400 can further include server-side components of the distributed proxy and cache system which can include a proxy server 125 and a server cache 435. In some embodiments, the proxy server 125 can include an HTTP access engine 445, a caching policy manager 455, a proxy controller 465, a traffic shaping engine 475, a new data detector 447 and/or a connection manager 495.

The HTTP access engine 445 may further include a heartbeat manager 498; the proxy controller 465 may further include a data invalidator module 468; the traffic shaping engine 475 may further include a control protocol 476 and a batching module 477. Additional or less components/modules/engines can be included in the proxy server 125 and each illustrated component.

In the example of a device (e.g., mobile device 450) making an application or content request to an application server or content provider 410, the request may be intercepted and routed to the proxy server 125 which is coupled to the device 450 and the application server/content provider 410. Specifically, the proxy server is able to communicate with the local proxy (e.g., proxy 175 of the examples of FIG. 1C) of the mobile device 450, the local proxy forwards the data request to the proxy server 125 in some instances for further processing and, if needed, for transmission to the application server/content server 410 for a response to the data request.

In such a configuration, the host 400, or the proxy server 125 in the host server 400 can utilize intelligent information provided by the local proxy in adjusting its communication with the device in such a manner that optimizes use of network and device resources. For example, the proxy server 125 can identify characteristics of user activity on the device 450 to modify its communication frequency. The characteristics of user activity can be determined by, for example, the activity/behavior awareness module 466 in the proxy controller 465 via information collected by the local proxy on the device 450.

In some embodiments, communication frequency can be controlled by the connection manager 495 of the proxy server 125, for example, to adjust push frequency of content or updates to the device 450. For instance, push frequency can be decreased by the connection manager 495 when characteristics of the user activity indicate that the user is inactive. In some embodiments, when the characteristics of the user activity indicate that the user is subsequently active after a period of inactivity, the connection manager 495 can adjust the communication frequency with the device 450 to send data that was buffered as a result of decreased communication frequency to the device 450.

In addition, the proxy server 125 includes priority awareness of various requests, transactions, sessions, applications, and/or specific events. Such awareness can be determined by the local proxy on the device 450 and provided to the proxy server 125. The priority awareness module 467 of the proxy server 125 can generally assess the priority (e.g., including time-criticality, time-sensitivity, etc.) of various events or applications; additionally, the priority awareness module 467 can track priorities determined by local proxies of devices 450.

In some embodiments, through priority awareness, the connection manager 495 can further modify communication frequency (e.g., use or radio as controlled by the radio controller 496, Internet/Wi-Fi Controller 497) of the server 400 with the devices 450. For example, the server 400 can notify the device 450, thus requesting use of the radio if it is not already in use when data or updates of an importance/priority level which meets a criteria becomes available to be sent.

In some embodiments, the proxy server 125 can detect multiple occurrences of events (e.g., transactions, content, data received from server/provider 410) and allow the events to accumulate for batch transfer to device 450. Batch transfer can be cumulated and transfer of events can be delayed based on priority awareness and/or user activity/application behavior awareness as tracked by modules 467 and/or 466. For example, batch transfer of multiple events (of a lower priority) to the device 450 can be initiated by the batching module 477 when an event of a higher priority (meeting a threshold or criteria) is detected at the server 400. In addition, batch transfer from the server 400 can be triggered when the server receives data from the device 450, indicating that the device radio is already in use and is thus on. In some embodiments, the proxy server 125 can order the each messages/packets in a batch for transmission based on event/transaction priority such that higher priority content can be sent first in case connection is lost or the battery dies, etc.

In some embodiments, the server 400 caches data (e.g., as managed by the caching policy manager 455) such that communication frequency over a network (e.g., cellular network) with the device 450 can be modified (e.g., decreased). The data can be cached, for example, in the server cache 435 for subsequent retrieval or batch sending to the device 450 to potentially decrease the need to turn on the device 450 radio. The server cache 435 can be partially or wholly internal to the host server 400, although in the example of FIG. 4 it is shown as being external to the host 400. In some instances, the server cache 435 may be the same as and/or integrated in part or in whole with another cache managed by another entity (e.g., the optional caching proxy server 199 shown in the example of FIG. 1C), such as being managed by an application server/content provider 410, a network service provider, or another third party.

In some embodiments, content caching is performed locally on the device 450 with the assistance of host server 400. For example, proxy server 125 in the host server 400 can query the application server/provider 410 with requests and monitor changes in responses. When changed or new responses are detected (e.g., by the new data detector 447), the proxy server 125 can notify the mobile device 450 such that the local proxy on the device 450 can make the decision to invalidate (e.g., indicated as outdated) the relevant cache entries stored as any responses in its local cache. Alternatively, the data invalidator module 468 can automatically instruct the local proxy of the device 450 to invalidate certain cached data, based on received responses from the application server/provider 410. The cached data is marked as invalid, and can get replaced or deleted when new content is received from the content server 410.

Note that data change can be detected by the detector 447 in one or more ways. For example, the server/provider 410 can notify the host server 400 upon a change. The change can also be detected at the host server 400 in response to a direct poll of the source server/provider 410. In some instances, the proxy server 125 can, in addition, pre-load the local cache on the device 450 with the new/updated data. This can be performed when the host server 400 detects that the radio on the mobile device is already in use, or when the server 400 has additional content/data to be sent to the device 450.

One or more the above mechanisms can be implemented simultaneously or adjusted/configured based on application (e.g., different policies for different servers/providers 410). In some instances, the source provider/server 410 may notify the host 400 for certain types of events (e.g., events meeting a priority threshold level). In addition, the provider/server 410 may be configured to notify the host 400 at specific time intervals, regardless of event priority.

In some embodiments, the proxy server 125 of the host 400 can monitor/track responses received for the data request from the content source for changed results prior to returning the result to the mobile device; such monitoring may be suitable when data request to the content source has yielded same results to be returned to the mobile device, thus preventing network/power consumption from being used when no new changes are made to a particular requested. The local proxy of the device 450 can instruct the proxy server 125 to perform such monitoring or the proxy server 125 can automatically initiate such a process upon receiving a certain number of the same responses (e.g., or a number of the same responses in a period of time) for a particular request.

In some embodiments, the server 400, through the activity/behavior awareness module 466, is able to identify or detect user activity at a device that is separate from the mobile device 450. For example, the module 466 may detect that a user's message inbox (e.g., email or types of inbox) is being accessed. This can indicate that the user is interacting with his/her application using a device other than the mobile device 450 and may not need frequent updates, if at all.

The server 400, in this instance, can thus decrease the frequency with which new or updated content is sent to the mobile device 450, or eliminate all communication for as long as the user is detected to be using another device for access. Such frequency decrease may be application specific (e.g., for the application with which the user is interacting on another device), or it may be a general frequency decrease (e.g., since the user is detected to be interacting with one server or one application via another device, he/she could also use it to access other services) to the mobile device 450.

In some embodiments, the host server 400 is able to poll content sources 410 on behalf of devices 450 to conserve power or battery consumption on devices 450. For example, certain applications on the mobile device 450 can poll its respective server 410 in a predictable recurring fashion. Such recurrence or other types of application behaviors can be tracked by the activity/behavior module 466 in the proxy controller 465. The host server 400 can thus poll content sources 410 for applications on the mobile device 450 that would otherwise be performed by the device 450 through a wireless (e.g., including cellular connectivity). The host server can poll the sources 410 for new or changed data by way of the HTTP access engine 445 to establish HTTP connection or by way of radio controller 496 to connect to the source 410 over the cellular network. When new or changed data is detected, the new data detector 447 can notify the device 450 that such data is available and/or provide the new/changed data to the device 450.

In some embodiments, the connection manager 495 determines that the mobile device 450 is unavailable (e.g., the radio is turned off) and utilizes SMS to transmit content to the device 450, for instance, via the SMSC 162 shown in the example of FIG. 1C. SMS is used to transmit invalidation messages, batches of invalidation messages, or even content in the case where the content is small enough to fit into just a few (usually one or two) SMS messages. This avoids the need to access the radio channel to send overhead information. The host server 400 can use SMS for certain transactions or responses having a priority level above a threshold or otherwise meeting a criteria. The server 400 can also utilize SMS as an out-of-band trigger to maintain or wake-up an IP connection as an alternative to maintaining an always-on IP connection.

In some embodiments, the connection manager 495 in the proxy server 125 (e.g., the heartbeat manager 498) can generate and/or transmit heartbeat messages on behalf of connected devices 450 to maintain a backend connection with a provider 410 for applications running on devices 450.

For example, in the distributed proxy system, local cache on the device 450 can prevent any or all heartbeat messages needed to maintain TCP/IP connections required for applications from being sent over the cellular, or other, network and instead rely on the proxy server 125 on the host server 400 to generate and/or send the heartbeat messages to maintain a connection with the backend (e.g., application server/provider 110 in the example of FIG. 1B). The proxy server can generate the keepalive (heartbeat) messages independent of the operations of the local proxy on the mobile device.

The repositories 412, 414, and/or 416 can additionally store software, descriptive data, images, system information, drivers, and/or any other data item utilized by other components of the host server 400 and/or any other servers for operation. The repositories may be managed by a database management system (DBMS), for example, which may be but is not limited to Oracle, DB2, Microsoft Access, Microsoft SQL Server, PostgreSQL, MySQL, FileMaker, etc.

The repositories can be implemented via object-oriented technology and/or via text files and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In one embodiment, the keepalive or heartbeat manager 490 can determine whether to continue or disconnect the TCP session with the content server to allow the content server to determine the correct status of the user/mobile device based the keepalives received or not received from the local proxy 175 or the mobile device. For example, if the keepalive manager 490 receives no keepalive when expected, the keepalive manager can terminate the session with the content server to enable the content server to determine the correct status of the user/mobile device.

Figure 4B:
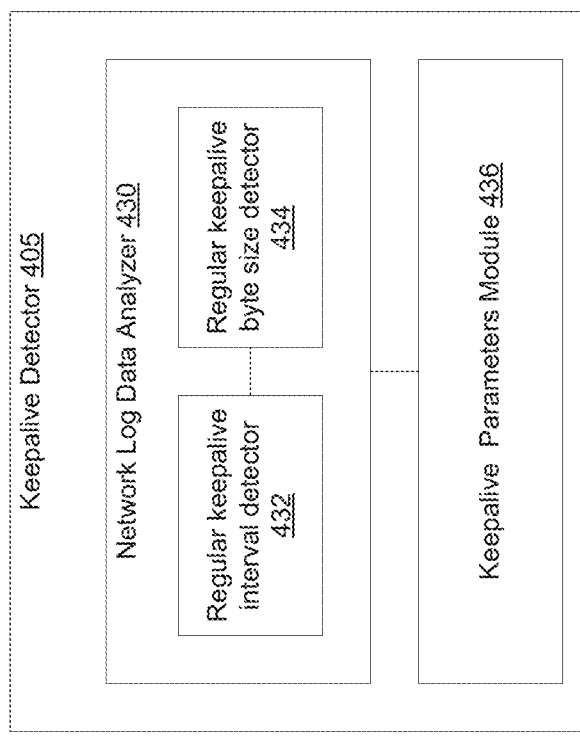
FIG. 4B depicts a block diagram illustrating additional components in the keepalive detector shown in the example of FIG. 4A.

In some embodiments, the proxy server 125 includes a keepalive detector 405 and/or a proprietary/non-standard protocol adaptation engine 470. FIG. 4B depicts a block diagram illustrating additional components in the keepalive detector shown in the example of FIG. 4A. The keepalive detector 405 can include a network log data analyzer 430 having a regular keepalive interval detector 432 and a regular keepalive byte size detector 434. These modules can perform same/similar functions as the corresponding modules described in reference to FIG. 3. The keepalive detector 405 can also include a keepalive parameters module 436 which can maintain keepalive parameters such as regular interval and byte sizes for mobile applications. These keepalive parameters can then be pushed to mobile devices for assistance in detecting keepalives or other network transactions.

Figure 4C:
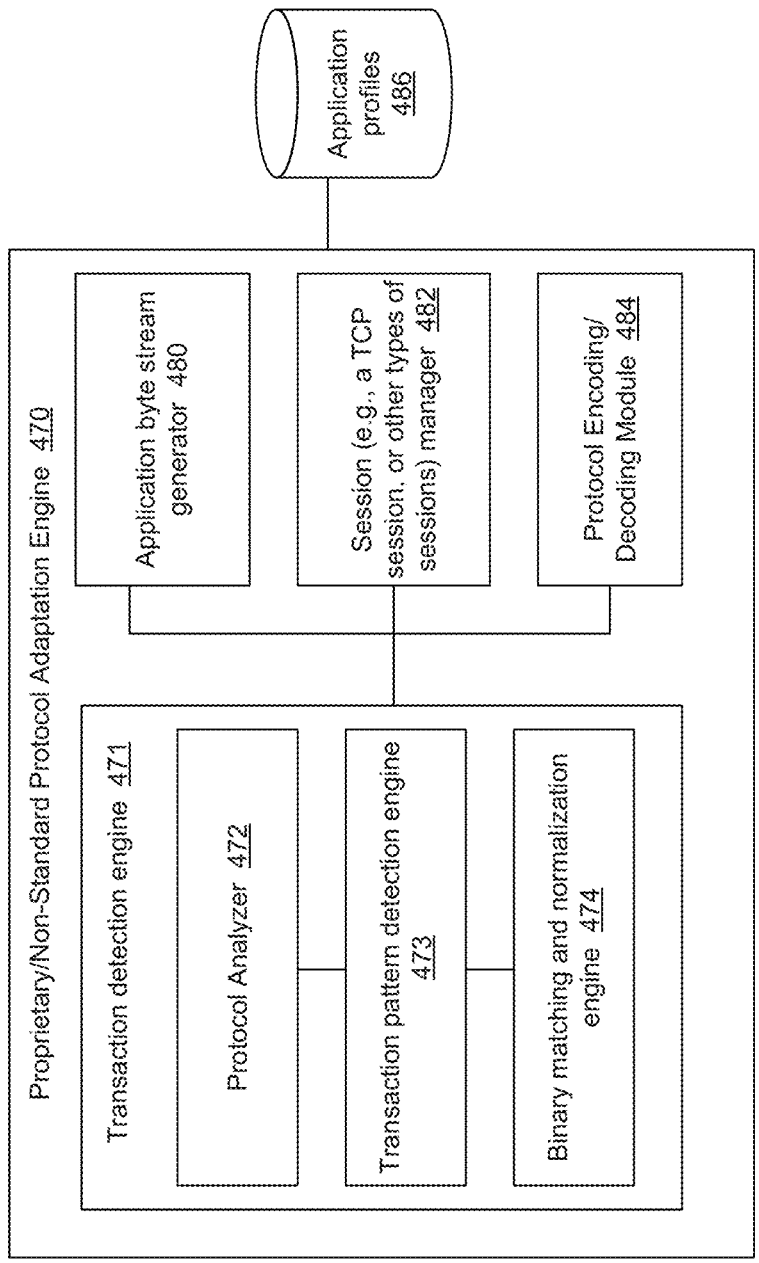
FIG. 4C depicts a block diagram illustrating additional components in the proprietary/non-standard protocol adaptation engine shown in the example of FIG. 2A.

FIG. 4C depicts a block diagram illustrating additional components in the proprietary/non-standard protocol adaptation engine shown in the example of FIG. 4A.

Referring to FIG. 3B, the proprietary/non-standard protocol adaptation engine 470 can include, for example, a transaction detection engine 471 having a protocol analyzer 472, transaction pattern detection engine 473 and a binary matching and normalization engine 474, an application byte stream generator 480, a session manager 482, and/or a protocol encoding/decoding module 484. Additional or less modules/engines can be included.

The various components of the proprietary/non-standard protocol adaptation engine 470 on the remote proxy or proxy server 125 can singularly or in any combination perform the above described functions and features related to signaling optimization in a wireless network for traffic utilizing proprietary and non-proprietary protocols. The various components of the proprietary/non-standard protocol adaptation engine 470 can also alone or in combination perform the above described functions with the mobile device or user equipment (UE) side component (e.g., the local proxy 275 and/or the proprietary/non-standard protocol adaptation engine 270 related to optimize signaling in a wireless network for traffic utilizing proprietary (non-standard) and non-proprietary (standard) protocols.

In one embodiment, many of the example components of the proprietary/non-standard protocol adaptation engine 470 on the proxy server can perform similar/same functions as the example components of the proprietary/non-standard protocol adaptation engine 270 on the local proxy. For example, the engine 470 can capture data for an application received from the content server. In one implementation, the application byte stream generator 480 can also provide a similar byte stream interface to capture data stream from the content server without having to understand the details of the protocol used.

The session manager 482 can, in one embodiment, manage TCP session including establishing of TCP sessions with the content server and the local proxy and tearing down of TCP sessions. Although the discussion is with respect to TCP, other similar or session based protocols may be implemented. Byte streams from the content server can be passed over to the local proxy via the TCP sessions. The session manager 482 may also coordinate the establishment of necessary handshakes between the application and the content server.

In one embodiment, the transaction detection engine 473 can detect and identify transactions based on analysis of the protocol headers and other protocol peculiarities. Such protocol specific analysis can be performed by a protocol analyzer 472. For example, the protocol analyzer 472 can detect transactions in HTTP protocol based on HTTP header. In another embodiment, the transaction detection engine 471 can be protocol agnostic, and can detect and/or identify transactions without knowing or understanding the underlying protocols. For example, the transaction detection engine 471 can detect and/or identify transactions based on observed and/or extracted patterns and/or content matching. In one implementation, for example, a pattern detection engine 473 can detect and/or extract various patterns or change in patterns embedded in byte streams corresponding to transactions from applications and/or client server. One such pattern can be idle time between transactions. The pattern detection engine can monitor byte streams from an application/client server over time, and detect an idle time of two minutes occurring in between transactions. The detection can occur without any protocol-specific understanding of the binary stream comprising the transaction. Various other patterns as described with respect to the proprietary/non-standard protocol adaptation engine 401 can be identified or extracted.

In one embodiment, the binary matching and normalization engine 474 can analyze content in byte streams to determine content similarity. The content similarity can be established by exact or fuzzy binary matches and binary-level normalizations can be applied to accommodate protocol-specificities, when determined. The transaction pattern detection engine 473 can also detect any change in the transaction pattern by using binary matching and normalization engine 474 in some embodiments. In one implementation, content of a byte stream from an application can be matched with content of byte stream corresponding to the identified pattern to determine whether the two contents are the same, similar, or approximately the same (e.g., same content but with different time stamp, increment factor, a random portion, etc.). Based on the result of the comparison, the transaction pattern detection engine 473 can determine whether there is a change in the pattern, and if so, the engine can alert or signal the session manager 482 to establish or re-establish a session with the local proxy to deliver the changed content received from the content server to the application via the local proxy.

In one embodiment, the proprietary/non-standard protocol adaptation engine 470 can include a protocol encoding/decoding module 484. In implementations where a binary stream is encapsulated within a security and/or encryption protocol such as Transport Layer Security (TLS), Secure Sockets Layer (SSL), and the like, the encoding/decoding module may include capabilities for decoding such protocols to extract the binary stream.

Figure 5:
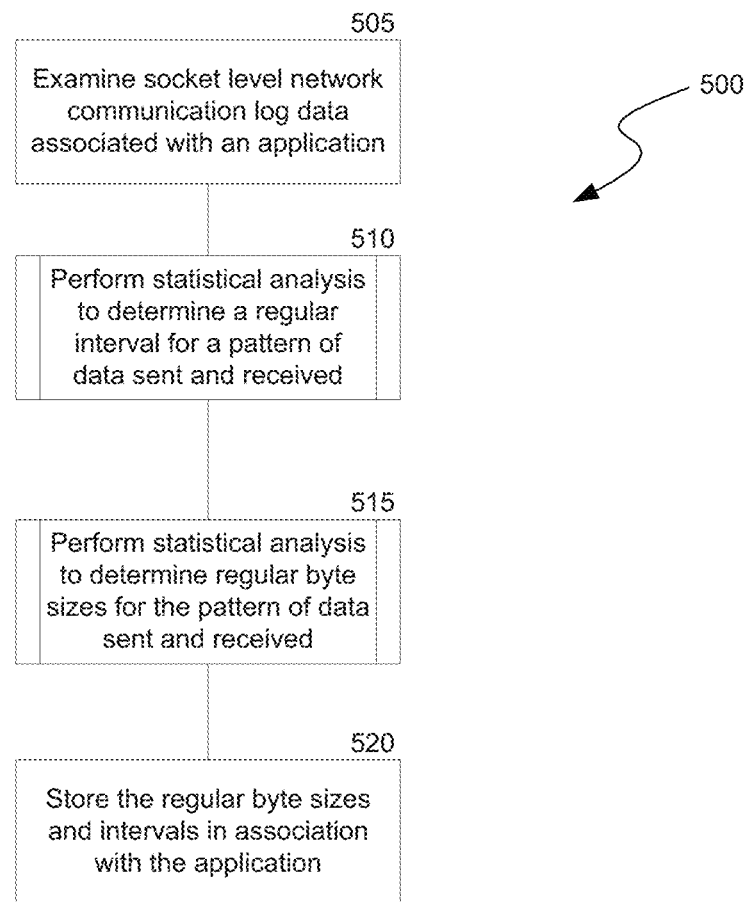
FIG. 5 depicts a logic flow diagram illustrating an example method of analyzing socket level network communication log data using statistical analyses to identify regular interval and regular byte sizes corresponding of keepalives originating from an application.
Figure 6:
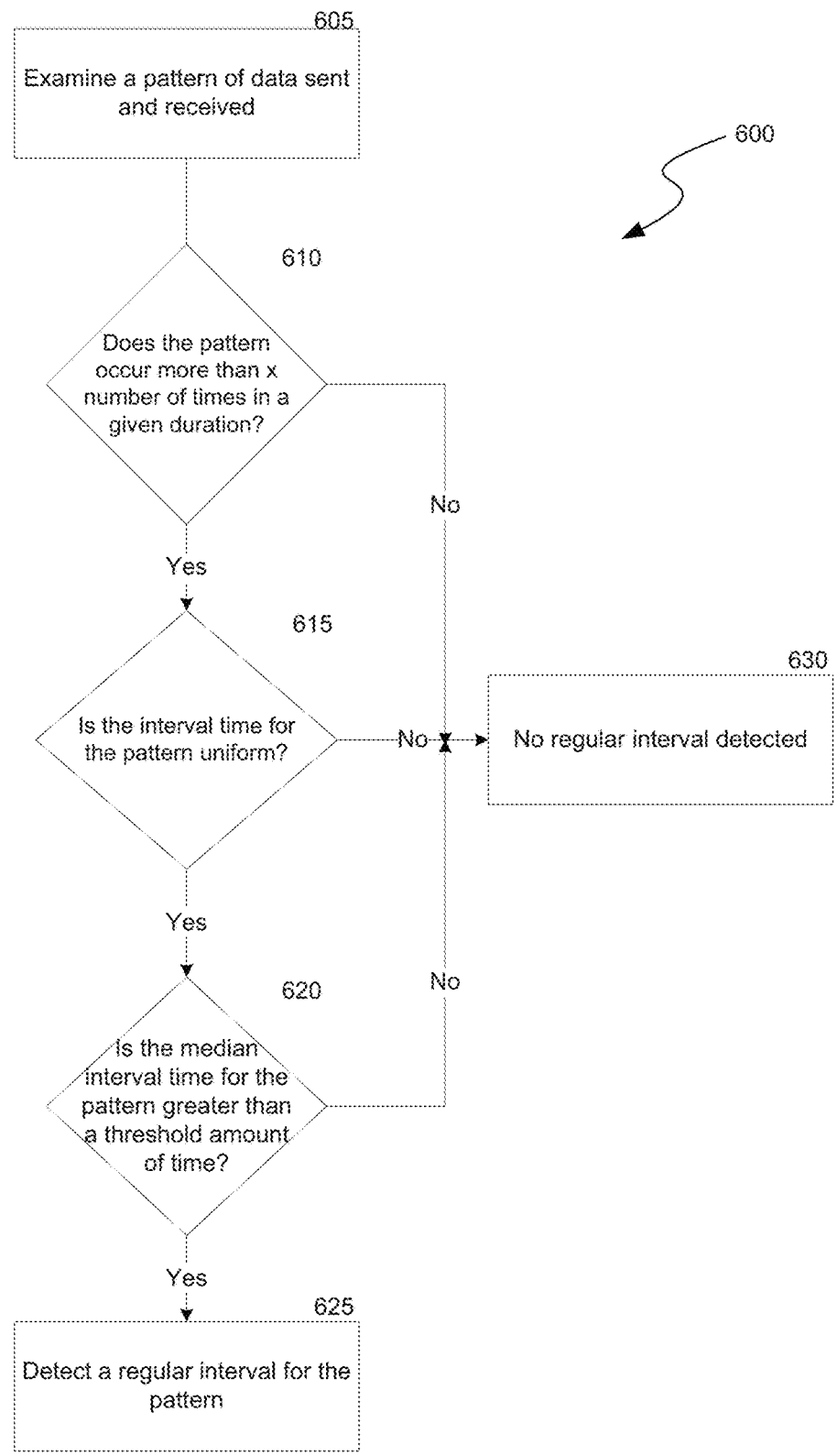
FIG. 6 depicts a logic flow diagram illustrating an example method of performing a statistical analysis on a pattern of data sent and received to determine a regular interval for the pattern.
Figure 7:
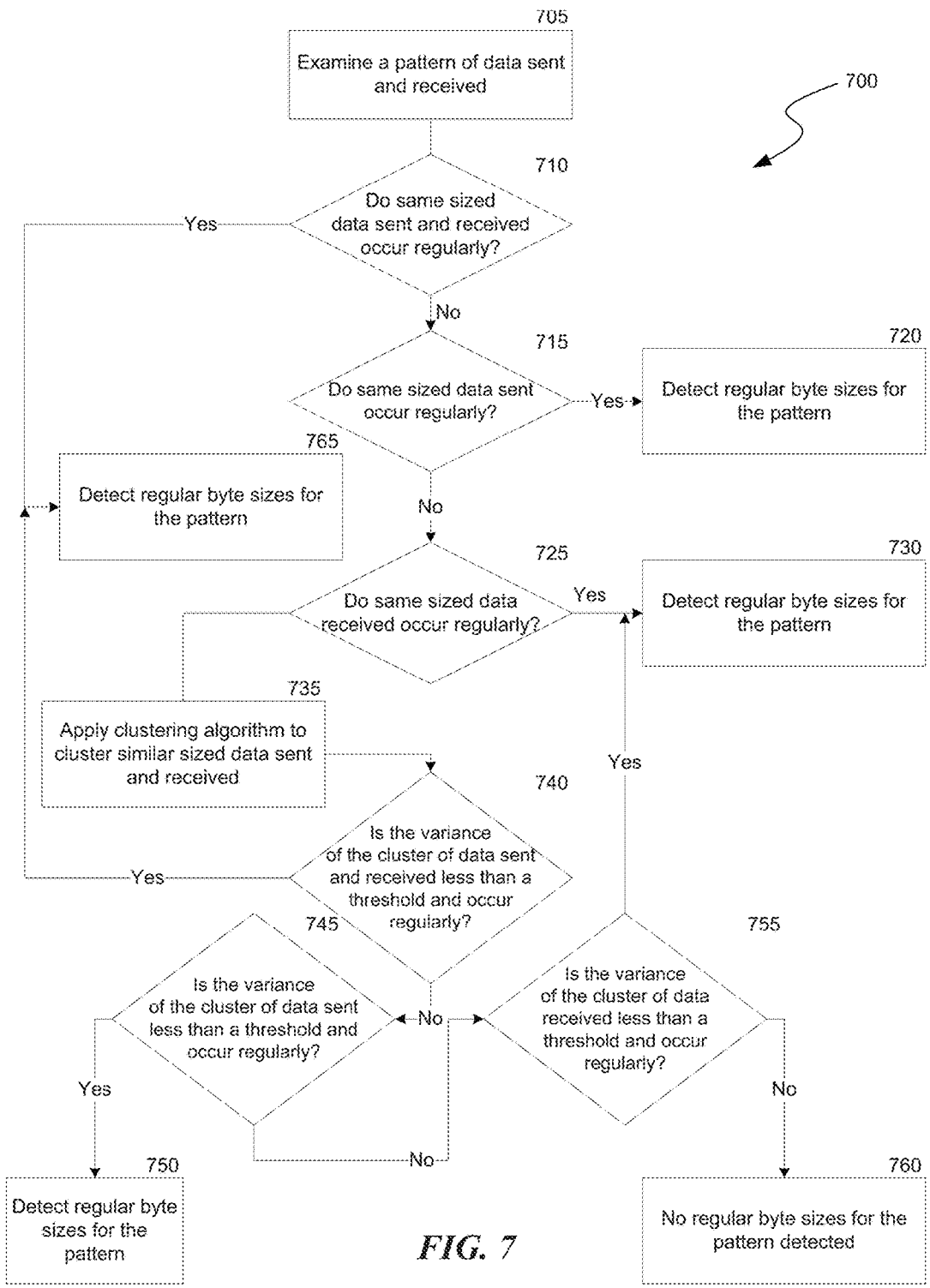
FIG. 7 depicts a logic flow diagram illustrating an example method of performing statistical analyses on a pattern of data sent and received to determine regular byte sizes for the pattern.

FIG. 5 depicts a logic flow diagram illustrating an example method 500 of analyzing socket level network communication log data using statistical analyses to identify regular interval and regular byte sizes corresponding of keepalives originating from an application. In the example method 500, a keepalive detector (e.g., keepalive detector 305 or the keepalive detector 405) examines socket level network communication log data. The log data can include information relating to bytes sent and received by multiple different applications or clients on a mobile device in some embodiments. The log data is examined on a per application basis. At block 510, the keepalive detector performs a statistical analysis on the log data corresponding to an application to determine a regular interval for a pattern of data sent from and received by that application. Referring to FIG. 6, an example method 600 of performing the statistical analysis on the bytes sent from and received by the application to determine a regular keepalive interval is described.

In the example method 600, the keepalive detector (e.g., the regular keepalive interval detector 432) examines the pattern of data sent and received by the application at block 605. The keepalive detector then determines if the pattern occurs more than a threshold (x) number of times in a given duration (e.g., more than 15 times per day) at decision block 615. If false, no regular interval can be detected and the method terminates at block 630. The method can be rerun once more data is logged. If true, the keepalive detector determines whether the interval time for the pattern is uniform at decision block 615. The interval time can be considered to be uniform if the interval times distributed close together. For example, if the $1^{st}$ quartile and $3^{rd}$ quartile difference is smaller than a median interval threshold, the interval can be considered uniform. Alternately, without looking at $1^{st}$ or $3^{rd}$ quartiles, the pattern can be considered uniform if the pattern contains a sequence of a threshold number of bytes sent and received whose intervals' variance is smaller than a threshold. For example, if the pattern contains a sequence of 3 bytes sent and received and the variance of the intervals between the bytes sent and received is less than 0.1, the pattern is considered to be uniform. If the pattern has no uniform interval time, the keepalive detector can terminate the method at block 630 without detecting a regular interval. Conversely, if the pattern has a uniform interval time, then the keepalive detector can determine if the median interval time for the pattern is greater than a threshold amount of time at decision block 620. If false, no regular interval can be detected and the method terminates at block 630. If true, a regular interval for the pattern is detected at block 625.

Referring to FIG. 5, at block 515, the keepalive detector performs statistical analysis on the log data corresponding to the application to determine a regular byte size of keepalives originating from that application. An example method of performing the statistical analysis is described in detail in FIG. 7. In the example method 700, the keepalive detector (e.g., keepalive regular byte size detector) examines the pattern of data sent and received at block 705. At decision block 710, the keepalive detector determines if the same sized data is sent and received regularly (i.e., if the pattern comprises the same sized data sent and received (e.g., 8 fromapp bytes and 10 fromnet bytes) at a "regular" interval as defined in the example method of FIG. 6). If true, the byte sizes of the data sent and received are detected as the regular byte sizes for the pattern at block 765. If false, the keepalive detector determines if the same sized data is sent regularly (i.e., in regular intervals as defined in the example method of FIG. 6) at decision block 715. If the same sized data is sent regularly, the keepalive detector detects the byte size of the data sent as a regular byte size for data sent at block 720. Conversely, if the same sized data is not sent regularly, the keepalive detector can determine if the same sized data is received regularly at decision block 725. If true, the keepalive detector detects the byte size of the data received as a regular byte size for received data. at block 730. If false, the keepalive detector applies a clustering algorithm to cluster similar sized data sent and received in the pattern at block 735. The keepalive detector then determines if the variance of the cluster of data sent and received is less than a threshold and if the pattern is a regular pattern (i.e., has a regular interval) at decision block 740. If true, the keepalive detector detects the pattern as having regular byte sizes at block 765. If false, the keepalive detector determines if the variance of the cluster of data sent is less than a threshold and if the pattern is a regular pattern at decision block 745. If true, the keepalive detector detects that the regular byte sizes for the pattern at block 750. If false, the keepalive detector again performs an analysis of the variance of the cluster of data received in the pattern to determine if the variance is less than a threshold and if the pattern occurs regularly at decision block 755. If true, the keepalive detector detects a regular byte size pattern at block 730. If false, the keepalive detector terminates the method at block 760 without detecting a regular byte size pattern. Referring to FIG. 5, the method 500 can store the regular byte sizes and regular intervals as keepalive parameters in association with the application such that the keepalive parameters can be used in detecting keepalives.

Figure 8:
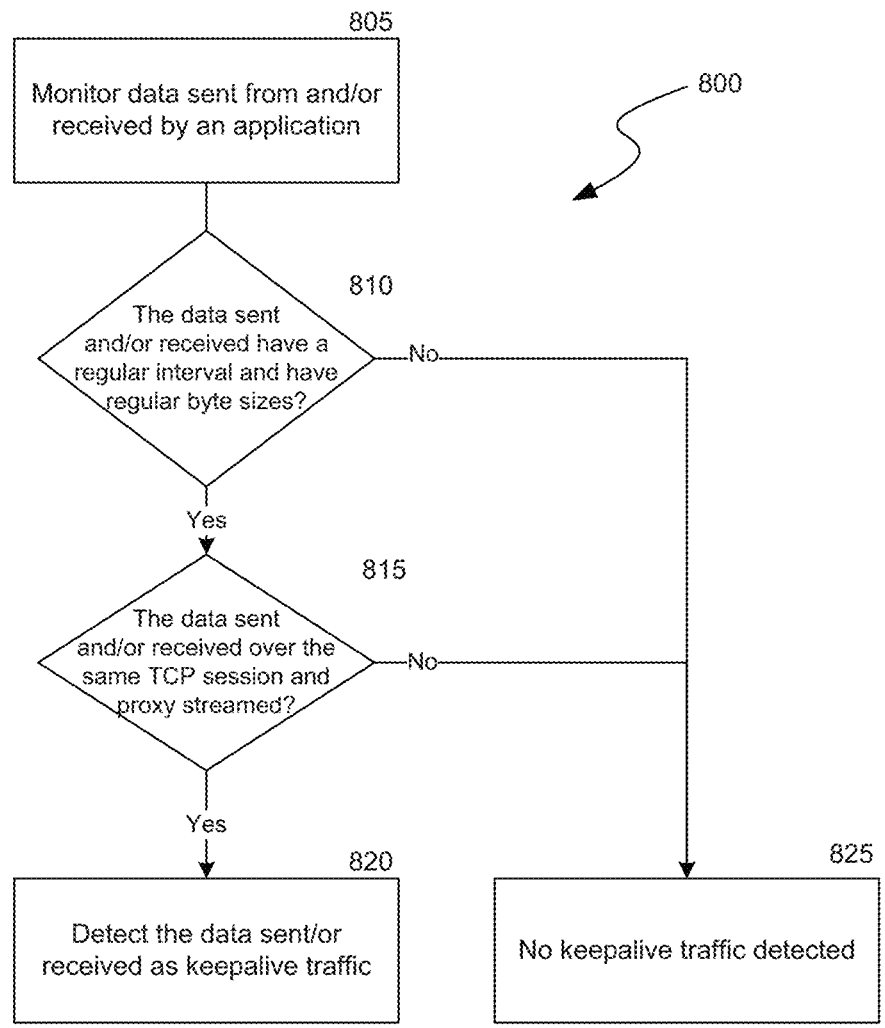
FIG. 8 depicts a logic flow diagram illustrating an example method of monitoring a TCP stream of data sent and received by the application and identifying keepalives from the TCP stream when the same TCP stream includes regular byte sized data sent and received at regular intervals.

For example, FIG. 8 depicts a logic flow diagram illustrating an example method of monitoring a TCP stream of data sent and received by the application and identifying keepalives from the TCP stream when the same TCP stream includes regular byte sized data sent and received at regular intervals. In the example method 800, the keepalive detector monitors data sent from and/or received by the application at block 810. The keepalive detector, at decision block 810, determines if the data sent and/or received have a regular interval and regular byte size pattern. In some embodiments, the determination can include comparing the interval and byte size pattern to the stored keepalive parameters determined for the application to determine if there is a match or if the values are similar (e.g., within a threshold such as +/−5%). In other embodiments, the keepalive detector can collect enough data to perform the statistical analysis associated with determining that the pattern of data has a regular interval and regular byte sizes. If the data sent and/or received have a regular interval and regular byte sizes, the keepalive detector determines the data sent and/or received occurred over the same TCP session and were proxy streamed at decision block 815. If true, the keepalive detector detects the data sent and/or received as keepalive traffic at block 820. Conversely, at decision block 810, if no regular interval and/or regular byte sizes was detected or the data was not sent or received over the same TCP session or the data was not proxy streamed, the keepalive detector does not detect any keepalive traffic at block 825.

Figure 9:
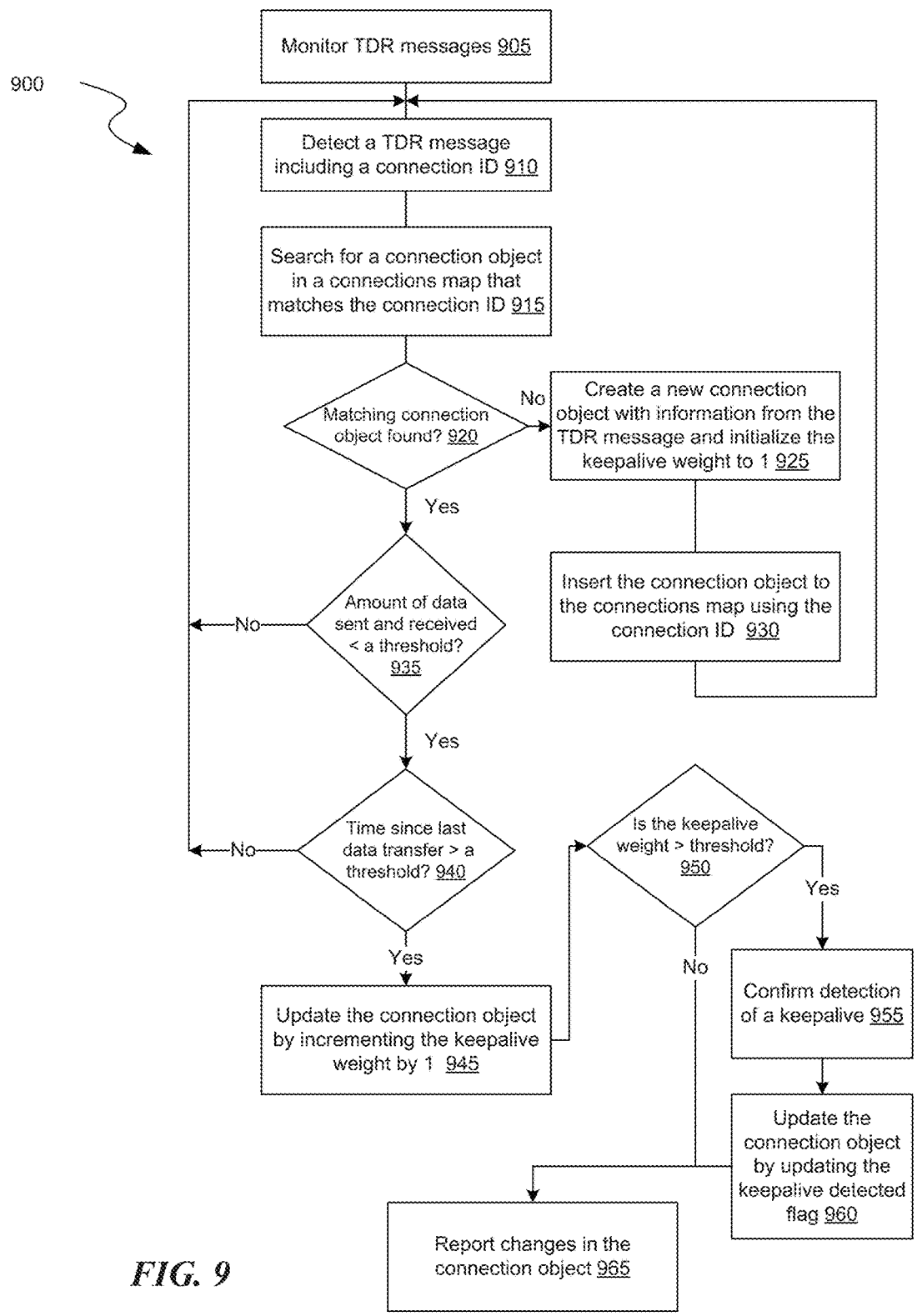
FIG. 9 depicts a logic flow diagram illustrating an example method of using timing characteristics and an amount of data sent and received to identify whether a connection or TCP stream contains a keepalive and reporting the detection of the keepalive.

FIG. 9 depicts a logic flow diagram illustrating an example method of using timing characteristics and an amount of data sent and received to identify whether a connection or TCP stream contains a keepalive and reporting the detection of the keepalive. In the example method 900, the keepalive detector (e.g., connection analyzer) monitors TDR messages at block 905. The keepalive detector detects a TDR message including a connection ID at block 910. The keepalive detector then searches for a connection object in a connections map that has a matching connection ID at block 915. If a matching connection object is not found at decision block 920, the keepalive detector creates a new connection object with information from the TDR message and initializes a keepalive weight associated with the object to 1 at block 925. The keepalive detector then inserts the connection object to the connections map using the connection ID at block 930.

Conversely, if a matching connection object is found at decision block 920, the keepalive detector determines if the amount of data sent and/or received is less than a threshold at decision block 935. If true, the keepalive detector determines if the time since the last data transfer is greater than a threshold at decision block 940. If true, the keepalive detector updates the connection object by incrementing the keepalive weight of the connection object by 1 at block 945. The keepalive detector then determines if the keepalive weight is greater than a threshold (e.g., 3) at decision block 950. If true, the keepalive detector confirms detection of a keepalive at block 955. The keepalive detector then updates the connection object by updating a flag to indicate a keepalive detected status. The keepalive detector then reports changes to the connection object including the keepalive detected status and the keepalive weight to a proxy server 125 or a host server (e.g., host server 100). In the case in which the keepalive weight is less than the threshold at decision block 950, the keepalive detector cannot confirm that the TDR message includes a keepalive, but the keepalive detector can still report changes in the connection object to the proxy server or the host server.

Figure 10:
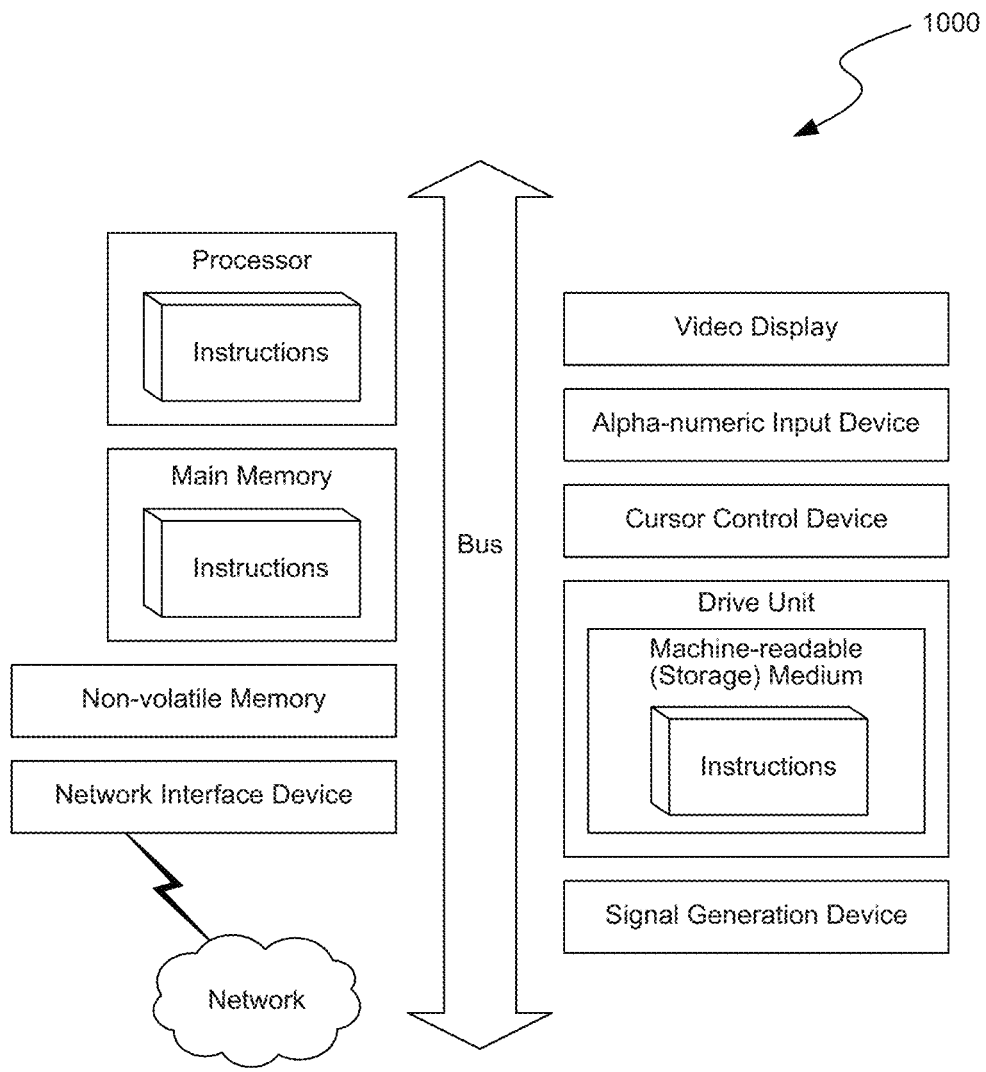
FIG. 10 depicts a diagrammatic representation of a machine in the example form of a computer system within which a set of instructions, for causing the machine to perform any one or more of the methodologies discussed herein, may be executed.

FIG. 10 depicts a diagrammatic representation of a machine in the example form of a computer system within which a set of instructions, for causing the machine to perform any one or more of the methodologies discussed herein, may be executed.

In the example of FIG. 10, the computer system 1000 includes a processor, memory, non-volatile memory, and an interface device. Various common components (e.g., cache memory) are omitted for illustrative simplicity. The computer system 1000 is intended to illustrate a hardware device on which any of the components depicted in the example of FIGS. 2A-2C, FIG. 3 and FIGS. 4A-4C (and any other components described in this specification) can be implemented. The computer system 1000 can be of any applicable known or convenient type. The components of the computer system 1000 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 12 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of detecting keepalives from stream data on a mobile device, comprising:
 detecting a message including stream data for a socket;
 based on information in the message, determining whether to create or update a connection object, the connection object associated with a data structure including an identifier for the connection object and time the socket was created;

evaluating the connection object to determine whether a keepalive is detected, the data structure further including a flag for indicating whether the keepalive was detected.

2. The method of claim 1, wherein the data structure further includes a keepalive weight that is initialized to a value on creation of the connection object and incremented each time the connection object is updated.

3. The method of claim 1, further comprising:
analyzing the message to determine time the socket was created;
creating the connection object when the socket was created was more than an amount of given time ago.

4. The method of claim 2, further comprising:
analyzing the message to determine the information including an amount of data transferred from a client to a server and from the server to the client and timing characteristics; and
updating the connection object when the amount of data transferred is less than a threshold amount and the timing characteristics indicates that a time interval since the last data transfer event occurred more than a threshold interval.

5. The method of claim 4, wherein evaluating the connection object to determine whether the keepalive is detected includes evaluating the keepalive weight of the connection object upon updating the connection object to determine whether the keepalive weight is higher than a threshold.

6. The method of claim 5, further comprising:
reporting changes to the connection object including a formatted form of the data structure to the server.

7. The method of claim 1, wherein a local proxy on the mobile device detects the keepalives from the stream data.

8. The method of claim 1, wherein the stream data is over a Transport Control Protocol.

9. The method of claim 1, further comprising:
aligning at least some of the keepalives to optimize transfer of the at least some of the keepalives to a wireless network.

10. A mobile device comprising:
a memory; and
a processor, the processor configured for
detecting a message including stream data for a socket;
based on information in the message, determining whether to create or update a connection object, the connection object associated with a data structure including an identifier for the connection object and time the socket was created;
evaluating the connection object to determine whether a keepalive is detected, the data structure further including a flag for indicating whether the keepalive was detected.

11. The mobile device of claim 10, wherein the data structure further includes a keepalive weight that is initialized to a value on creation of the connection object and incremented each time the connection object is updated.

12. The mobile device of claim 10, further comprising:
analyzing the message to determine time the socket was created;
creating the connection object when the socket was created was more than an amount of given time ago.

13. The mobile device of claim 10, further comprising:
analyzing the message to determine the information including an amount of data transferred from a client to a server and from the server to the client and timing characteristics; and
updating the connection object when the amount of data transferred is less than a threshold amount and the timing characteristics indicates that a time interval since the last data transfer event occurred more than a threshold interval.

14. The mobile device of claim 13, wherein evaluating the connection object to determine whether the keepalive is detected includes evaluating a keepalive weight of the connection object upon updating the connection object to determine whether the keepalive weight is higher than a threshold.

15. The mobile device of claim 14, further comprising:
reporting changes to the connection object including a formatted form of the data structure to the server.

16. The mobile device of claim 10, wherein a local proxy on the mobile device detects the keepalives from the stream data.

17. The mobile device of claim 10, wherein the stream data is over a Transport Control Protocol.

18. The mobile device of claim 10, further comprising:
aligning at least some of the keepalives to optimize transfer of the at least some of the keepalives to a wireless network.

* * * * *